US011777926B2

(12) United States Patent
Pochuev et al.

(10) Patent No.: US 11,777,926 B2
(45) Date of Patent: Oct. 3, 2023

(54) INTERNET OF THINGS (IOT) DEVICE MANAGEMENT

(71) Applicant: Cryptography Research, Inc., Sunnyvale, CA (US)

(72) Inventors: Denis Alexandrovich Pochuev, San Francisco, CA (US); Michael A. Hamburg, San Francisco, CA (US); Pankaj Rohatgi, Los Altos, CA (US); Amit Kapoor, San Francisco, CA (US); Joel Patrick Wittenauer, Pleasanton, CA (US)

(73) Assignee: Cryptography Research, Inc., San Jose, CA (US)

( * ) Notice: Subject to any disclaimer, the term of this patent is extended or adjusted under 35 U.S.C. 154(b) by 489 days.

(21) Appl. No.: 16/619,906

(22) PCT Filed: Jun. 14, 2018

(86) PCT No.: PCT/US2018/037527
§ 371 (c)(1),
(2) Date: Dec. 5, 2019

(87) PCT Pub. No.: WO2018/232111
PCT Pub. Date: Dec. 20, 2018

(65) Prior Publication Data
US 2020/0145409 A1    May 7, 2020

Related U.S. Application Data

(60) Provisional application No. 62/521,130, filed on Jun. 16, 2017.

(51) Int. Cl.
*H04L 9/40*    (2022.01)
*H04W 12/30*    (2021.01)
*H04W 12/069*    (2021.01)

(52) U.S. Cl.
CPC ...... *H04L 63/0853* (2013.01); *H04L 63/0823* (2013.01); *H04L 63/0876* (2013.01);
(Continued)

(58) Field of Classification Search
CPC ............. H04L 63/0853; H04L 63/0823; H04L 63/0876; H04L 63/166; H04L 63/20;
(Continued)

(56) References Cited

U.S. PATENT DOCUMENTS

2004/0039827 A1* 2/2004 Thomas ................ H04L 67/561
709/228
2005/0005170 A1* 1/2005 Camenisch ............. G06F 21/33
726/4
(Continued)

FOREIGN PATENT DOCUMENTS

CN        104025503 A    9/2014
CN        104718526 A    6/2015
(Continued)

OTHER PUBLICATIONS

Notification of Transmittal of the International Search Report and the Written Opinion of the Internationals Searching Authority, or the Declaration dated Oct. 29, 2018 re: Int'l Appln. No. PCT/US18/037527. 13 Pages.
(Continued)

*Primary Examiner* — Khoi V Le
(74) *Attorney, Agent, or Firm* — Lowenstein Sandler LLP

(57) ABSTRACT

The embodiments described herein describe technologies to address initial establishment of device credentials in an Internet of Things (IoT) infrastructure. The embodiments are directed to unifying secure credential establishment regardless of the endpoint type, thus addressing the challenge of a great diversity among IoT devices. This approach is designed to address a challenge of initial trusted enrollment of the IoT endpoints into a secure infrastructure, which allows secure communications between the devices in the IoT environment.

29 Claims, 22 Drawing Sheets

(52) U.S. Cl.
CPC ............ *H04L 63/166* (2013.01); *H04L 63/20* (2013.01); *H04W 12/069* (2021.01); *H04W 12/35* (2021.01)

(58) Field of Classification Search
CPC .. H04L 63/061; H04W 12/35; H04W 12/069; H04W 4/70; G06F 7/00
See application file for complete search history.

(56) References Cited

U.S. PATENT DOCUMENTS

| | | | | |
|---|---|---|---|---|
| 2013/0111576 | A1* | 5/2013 | Devine | H04L 41/5067 726/11 |
| 2013/0198801 | A1* | 8/2013 | Nishizawa | H04L 63/08 726/1 |
| 2016/0285628 | A1* | 9/2016 | Carrer | H04L 9/321 |
| 2017/0171607 | A1* | 6/2017 | Britt | H04W 4/80 |
| 2018/0234787 | A1* | 8/2018 | Karimli | H04W 4/70 |
| 2018/0338242 | A1* | 11/2018 | Li | H04W 12/041 |

FOREIGN PATENT DOCUMENTS

| | | |
|---|---|---|
| JP | 2003-525475 A | 8/2003 |
| JP | 2014-517560 A | 7/2014 |
| WO | WO-99/16203 A2 | 4/1999 |

OTHER PUBLICATIONS

JP Office Action dated May 10, 2022 re: JP Appln. No. 2019-555755. 6 pages. (W/Translation).
CN Office Action dated Apr. 28, 2023 re: CN Appln. No. 201880039511.0. 8 pages. (W/Translation).

* cited by examiner

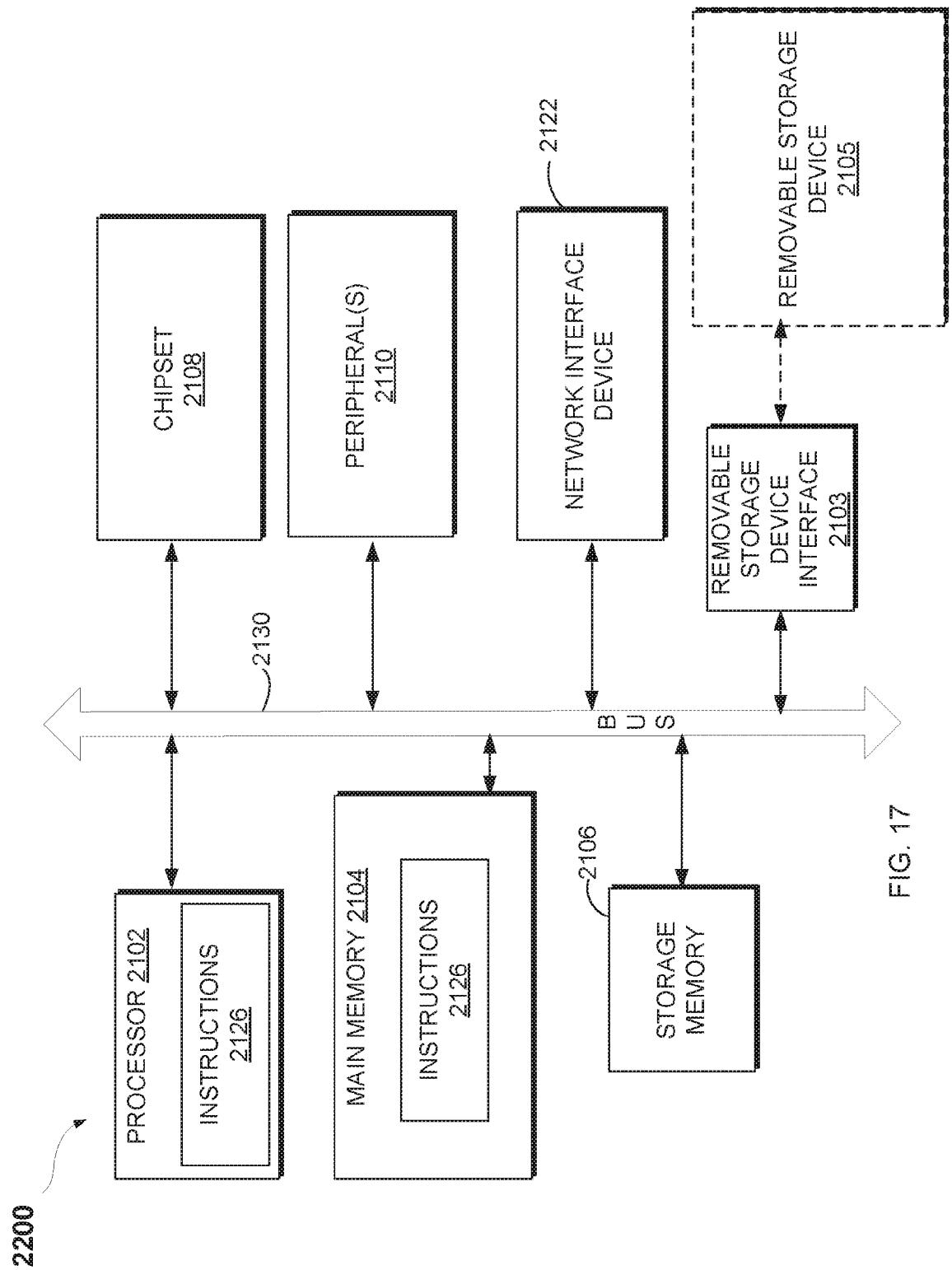

INTERNET OF THINGS (IOT) DEVICE MANAGEMENT

BACKGROUND

The need for secure systems and applications is growing. Presently, secure integrated circuits (ICs) are often programmed with security keys on the factory floor. Secure keys may be used in a variety of ways, such as, for example, to protect stored data, control access to digital content, or encrypt/authenticate data used in transactions. These keys can be stored in a one-time programmable memory, which may hold keys directly or hold a base key that is used with cryptographic functions that derive keys for various functions. Typically, security is provided by performing the key loading process in a secured facility. The use of Internet of Things (IoT) devices and IoT applications is also growing. IoT devices need credentials in order to attach to IoT application services and IoT platform services. However, it is difficult to provide these credentials in manufacturing because of the equipment and expertise required to provide the credentials at manufacturing. Also, the computing and storage resources of IoT devices vary and are often limited.

BRIEF DESCRIPTION OF THE DRAWINGS

The present disclosure is illustrated by way of example, and not by way of limitation, in the figures of the accompanying drawings.

FIG. 17 is a diagram of one embodiment of a computer system in which any of the methodologies described herein may be performed according to one embodiment.

DETAILED DESCRIPTION

Described herein are technologies directed to Internet of Things (IoT) device management. IoT devices need credentials in order to attach to application services, platform services, or the like. However, it is difficult to provide these credentials in manufacturing because of the equipment and expertise required. Described herein is an IoT security services (ISS) infrastructure that can be used to uniquely identify these IoT devices in the field, challenge the IoT devices, gain knowledge of cryptographic material that is inside the IoT devices, and verify that the IoT devices have knowledge of its own cryptographic material. Once an IoT device has provided evidence of its identity, credentials can be given to that IoT device to connect to a platform service, application service, or the like. An IoT device has a unique identity and a cryptographic key. The ISS infrastructure has knowledge about that cryptographic key inside the device. The IoT device can send a message to one of the servers of the ISS infrastructure, requesting credentials for a particular platform service. Servers of the ISS infrastructure can send a challenge to that IoT device. The IoT device calculates the challenge using the key and sends the cryptographic calculation in a response back to the servers. The servers validate that the response to the challenge is correct, as well as its identity and the foreknowledge of the cryptographic key inside the IoT device. Once the response to the challenge is verified, the servers can distribute the platform credentials to the IoT device.

Previously, a typical scenario of enrolling an end point into an IoT domain involved manual enrollment. The manual enrollment process required plugging a cable into the end point by a device (e.g., IoT hub or platform device) to establish a credential for the IoT device. This is difficult to perform on a larger scale and impossible to do remotely. The embodiments described herein permit management of IoT devices, including enrollment of IoT devices, remotely and on a larger scale.

In one embodiment, a system for establishing a distributed trust network has a device with a hardware or software root of trust, an application service providing an application to the device, and a root of trust service with direct knowledge of the device's root of trust. The root of trust server provides authentication services and secure provisioning services for the application service, so that the application service can establish a trusted connection with the device without having direct knowledge of the device's root of trust. The direct knowledge may be based on one or more keys provisioned during device manufacturing of the device. Direct knowledge means that this information is received by means other than the system itself. The information can be exchanged out-of-band (external in space) or previously (external in time).

Figure 1:
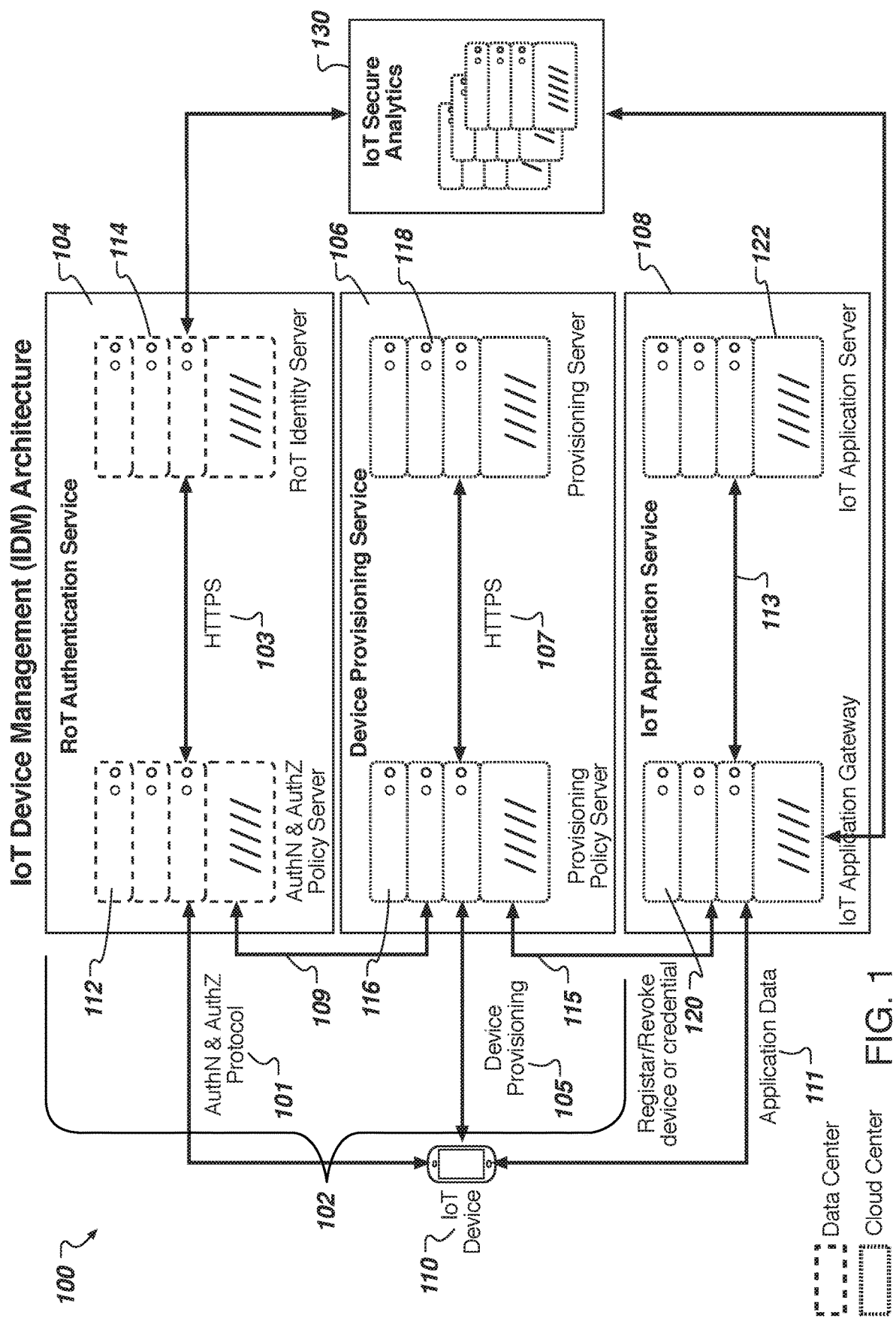
FIG. 1 illustrates a system diagram of an IoT Device Management (IDM) system according to one embodiment.

FIG. 1 illustrates a system diagram of an IoT Device Management (IDM) system 100 according to one embodiment. The IDM system 100 includes root of trust (RoT) services 102 that provide authentication services 104 and device provisioning services 106 so that an IoT application service 108 can establish a trusted connection with an IoT device 110 without having direct knowledge of a RoT of the IoT device 110. The RoT of the IoT device 110 can be a hardware RoT, a software RoT, or any combination thereof. The RoT service 102 includes an authentication and authorization policy server 112 (hereinafter "authentication policy server 112") and a RoT identity server 114. The IoT device 110 can communicate with the authentication service 104 using a front-end protocol 101 (labeled AuthN and AuthZ protocol for authentication and authorization) that is flexible. In one embodiment, the authentication policy server 112 and the RoT identity server 114 communicate using a back-end protocol 103 that is independent from the front-end protocol 101, such as Hyper Text Transfer Protocol Secure (HTTPS). In some embodiments, the front-end protocol 101 holds a state of the IoT device 110 and the back-end protocol is state-less. The front-end protocol 101 can include a chip manufacturer's business requirements for the IoT device 110, a communication protocol, and an authentication protocol. The authentication services 104 can be split between two servers as a tradeoff between security and flexibility. By putting the RoT identity server 114 as a separate server from the authentication policy server 112, there can be flexibility and security. The authentication policy server 112 can provide flexibility in the protocol-specific communication with the different types of IoT devices, whereas the security credentials stored in by the RoT identity server 114 can be secured. For example, the RoT identity server 114 may contain a database of device keys that need to be secured. Access to the database in the RoT identity server 114 can be managed by the authentication policy server 112 that authenticates the IoT device and authorizes the IoT device 110 before providing the secure credentials stored by the RoT identity server 114, as compared to a more direct access to the RoT identity server 114 by the IoT device 110. In effect, the RoT identity server 114 can be considered hidden from the IoT device 110. In other embodiments, the authentication policy server 112 and the RoT identity server 114 can be implemented together in a single server. In one embodiment, the front-end protocol 101 includes a chip manufacturer's business requirements for the IoT device 101, a communication protocol to be used for communications between the devices, and an authentication protocol used to authenticate IoT devices 110. It should be noted that although one authentication policy server 112 and one RoT identity server 112 are shown, in other embodiments, the authentication service 104 can include multiple authentication policy servers and multiple RoT identity servers, or any combination thereof. For example, there may be multiple authentication policy servers, but a single RoT identity server 114.

As described above, the RoT services 102 include the device provisioning services 106. As illustrated, a front-end provisioning policy server 116 and a back-end provisioning server 118 can provide the device provisioning services 106. The IoT device 110 can communicate with the front-end provisioning policy server 116 using a front-end protocol 105 (labeled device provisioning) that is protocol-specific. In one embodiment, the front-end provisioning policy server 116 and the back-end provisioning server 118 communicate using a back-end protocol 107 that is independent from the front-end protocol 105, such as HTTPS. The device provisioning services 106 can be split between two servers as a tradeoff between security and flexibility, much like the authentication policy server 112 and the RoT identity server 114 of the authentication services 104. By putting the provisioning server 118 as a separate server from the provisioning policy server 116, there can be flexibility and security. The provisioning policy server 116 can provide flexibility in the protocol-specific communication with the different types of IoT devices, whereas the provisioning server 118 can be hidden from the IoT device 110. In other embodiments, the provisioning policy server 116 and the provisioning server 118 can be implemented together in a single server. It should be noted that although one provisioning policy server 116 and one provisioning server 118 are shown, in other embodiments, the device provisioning service 106 can include multiple provisioning policy servers and multiple provisioning servers, or any combination thereof. For example, there may be multiple provisioning policy servers, but a single provisioning server 118. In one embodiment, the front-end protocol 101 holds a state and the back-end protocol 103 is state-less. In one embodiment, the front-end protocol 105 includes a chip manufacturer's business requirements for the IoT device 101, a communication protocol to be used for communications between the devices, and an authentication protocol used to authenticate IoT devices 110. The front-end protocol 105 may also identify the RoT authentication service that should be used to authenticate the IoT device 110.

As illustrated in FIG. 1, the policy provisioning server 116 can communicate with the authentication policy server 112 (and the RoT identity server 114) via a secured connection 109. Over the secured connection 109, the policy provisioning server 116 can exchange security credentials, establish policies, and exchange session credentials with the authentication policy server 112, for example, by providing message authentication codes (MACs) as described below. The policies can include the rules or decisions of when to provision the IoT device 110 and/or when not to provision the IoT device 110.

As described above, the RoT services 102 provide the authentication services 104 and the device provisioning services 106 so that the IoT application service 108 can establish a trusted connection with an IoT device 110 without having direct knowledge of a RoT of the IoT device 110. The IoT application service 108 includes an IoT application gateway 120 and an IoT application server 122 to provide an IoT application to the IoT device 110. The IoT device 110 can communicate with the IoT application gateway 120 using a front-end protocol 111 (labeled application data) that is protocol-specific. In one embodiment, the IoT application gateway 120 and the IoT application server 122 can communicate using a back-end protocol 113 that is independent from the front-end protocol 111. This back-end protocol 113 may not necessarily be secure since the application data is communicated over a secure connection as described herein. Alternatively, the IoT application gateway 120 and the IoT application server 122 can communicate using HTTPS. The IoT application gateway 120 can determine whether the IoT 110 has access to the IoT application server 122. That is the IoT application gateway 120 can authenticate/authorize the IoT device 110 before the IoT application server 122 provides the IoT application service 108 to the IoT device 110. In effect, the IoT application server 122 can be considered hidden from the IoT device 110. In other embodiments, the IoT application gateway 120 and the IoT application server 122 can be implemented together in a single server. It should be noted that although one IoT application gateway 120 and one IoT application server 122 are shown, in other embodiments, the IoT application service 108 can include multiple IoT application gateways and multiple IoT application servers.

As illustrated in FIG. 1, IoT application gateway 120 can communicate with the provisioning policy server 116 (and the provisioning server 118) via a secured connection 115. Over the secured connection 115, the provisioning policy server 116 can exchange the provisioned information presented by the IoT device 110 to check whether access should be granted to the IoT device 110 by the IoT application gateway 120 as described below.

The authentication services 104 can be managed by a first entity, such as an authentication service provider. The device provisioning services 106 can be managed by a second entity, such as an IoT platform provider. The IoT application services 108 can be managed by a third entity. In some cases, the authentication services 104 and the device provisioning services 106 can be managed by a single entity. In some cases, the device provisioning services 106 and the IoT application services 108 can be managed by a single entity. It should also be noted that the servers of these services can be deployed in multiple machines and may be located in separate facilities. For example, the servers of the authentication services 104 can be deployed in a secured data center and the servers of the device provisioning services 106 and the IoT application services 108 can be deployed in a cloud data center.

In another embodiment, an IoT secure analytics service 130 can communicate with each of the authentication service 104, the device provisioning service 106, and the IoT application service 108 to collect information for data analytics of the ISS infrastructure. In the depicted embodiment of FIG. 1., the IoT secure analytics service 130 communicates with the IoT application gateway 120, the provisioning server 118, and the RoT identity server 114. In other embodiments, the IoT secure analytics service can communicate with other servers within the respective services to collect data for analytics.

In some embodiments, the IoT device 110 includes a hardware RoT. In other embodiments, the IoT device 110 includes a software RoT. In one embodiment, a cryptographic core of the IoT device 110 (also referred to as a secure core) can manage access to the hardware or software RoT. Instead of a user having credentials, the IoT device has attributes stored at the authentication service 104. These attributes are referred to as RoT attributes, and may include 1) Sessions keys; 2) Sequences (inputs accepted); 3) Containers (programs, code, etc.); 4) Derived keys, or any combination thereof. The authentication service 104 can authorize the use of the RoT attributes to external parties, such as the device provisioning service 106, firmware updates, group privacy identity, or the like. In some embodiments, the RoT attributes need not be stored in a database, but could be generated on demand by the authentication service 104. The RoT attributes may be key materials, device metadata such as kernel versions or the like, or other attributes.

In one embodiment, the authentication policy server 112 is the Cryptography Research Division (CRD) Authentication/Authorization (AuthN/AuthZ) Policy Server, which can be located in a first facility. The authentication policy server 112 can be responsible for the AuthN/AuthZ policies and token management, as described herein. The authentication policy server 112 can issue tokens back to the IoT device 110 (client) and can make use of the RoT identity server 114. The authentication policy server 112 can primarily be used to map client side policies and protocols to a set of one or more application programming interfaces (APIs) of the RoT identity server 114. The RoT identity server 114 can be responsible for storing and managing the RoT attributes for the RoT secure core in the IoT device 110. For example, in a symmetric key cryptosystem, the RoT identity server 114 can store the symmetric keys.

At the device provisioning server 106, the provisioning policy server 116 can be similar to the authentication policy server 112, operating as a front-end server that manages the provisioning policy for the IoT devices 110. The provisioning policy server 116 can be a front-end to a specific server to provision information on the IoT device 110. For example, the provisioning server 118 can issue certificates. The provisioning policy server 116 can expect an access token as part of the provisioning request, where the access token should have been issued by the authentication policy server 112. The provisioning policy server 116 can potentially use the access token to request other attributes for the associated RoT. If the token and request are valid, the provisioning policy server 116 can issue the provisioning information to the IoT device 110 and may also inform the service provider platform (e.g., for example, operators of the device provisioning service 106). This may be done via an API of the provisioning server 118. The provisioning server 118 may also include an additional API call to revoke device credentials. In this case, the provisioning policy server 116 can make a call to the service provider to revoke the credentials. The provisioning server 118 can be responsible for provisioning the requisite information for a certificate authority.

At the IoT application service 108, the IoT application gateway 120 is responsible for taking IoT client data related to a security state on the IoT device 110 and re-directing the IoT device 110 to the IoT application server 122. Although the IoT application gateway 120 is illustrated as a server, in other embodiments, the IoT application gateway 120 can be implemented as a set of rules integrated into an API provided by the IoT application server 122 or the IoT platform provider. The IoT application server 122 can be configured to only allow IoT devices 110 with valid certificates to connect to an IoT application. The IoT application server 122 can support message queuing telemetry transport (MQTT) over Transport Layer Security (TLS). Alternatively, the IoT application server 122 can support other publish-subscribe message protocols. The IoT application server 122 may or may not use a message broker. The IoT application server 122 can allow provide the IoT application data along with the user interface (UI) for application logic.

At the IoT secure analytics service 130, server(s) is responsible for analyzing data and reporting anomalies in the data. In addition to providing authentication statistics, the IoT secure analytics service 130 can be used to detect anomalies and non-credential data, which can be inputs or considerations for policy decisions or business logic to modify policy decisions.

In one embodiment, a client software development kit (SDK or devkit) can be provided to IoT device manufactures or IoT platform providers that allow the creation of applications for interacting with the IoT application. The client SDK can provide a capability based plug-in architecture with additional ability to execute scripts downloaded from a server to implement a particular profile or policy. The plug-ins can be dynamic and additional plug-ins can be downloaded. Some IoT devices that have few resources may not store all plug-ins. The plug-ins could be tied together via dynamic script (say embedded Lua) which itself is downloadable (signed for authentication). The IoT device 110 may also be provided with an authentication library supporting various AuthN/AuthZ models. These library and plug-ins may need to be very small with an Open ID protocol, for example. A provisioning library support for X.509 certificate can also be provided, but the provisioning library may need to be very simple and lightweight in terms of computing resources. For example, the IoT client libraries can includes IoT client libraries provided by third-party vendors or IoT platform providers. These IoT client libraries can use MQTT over TLS.

Figure 2:
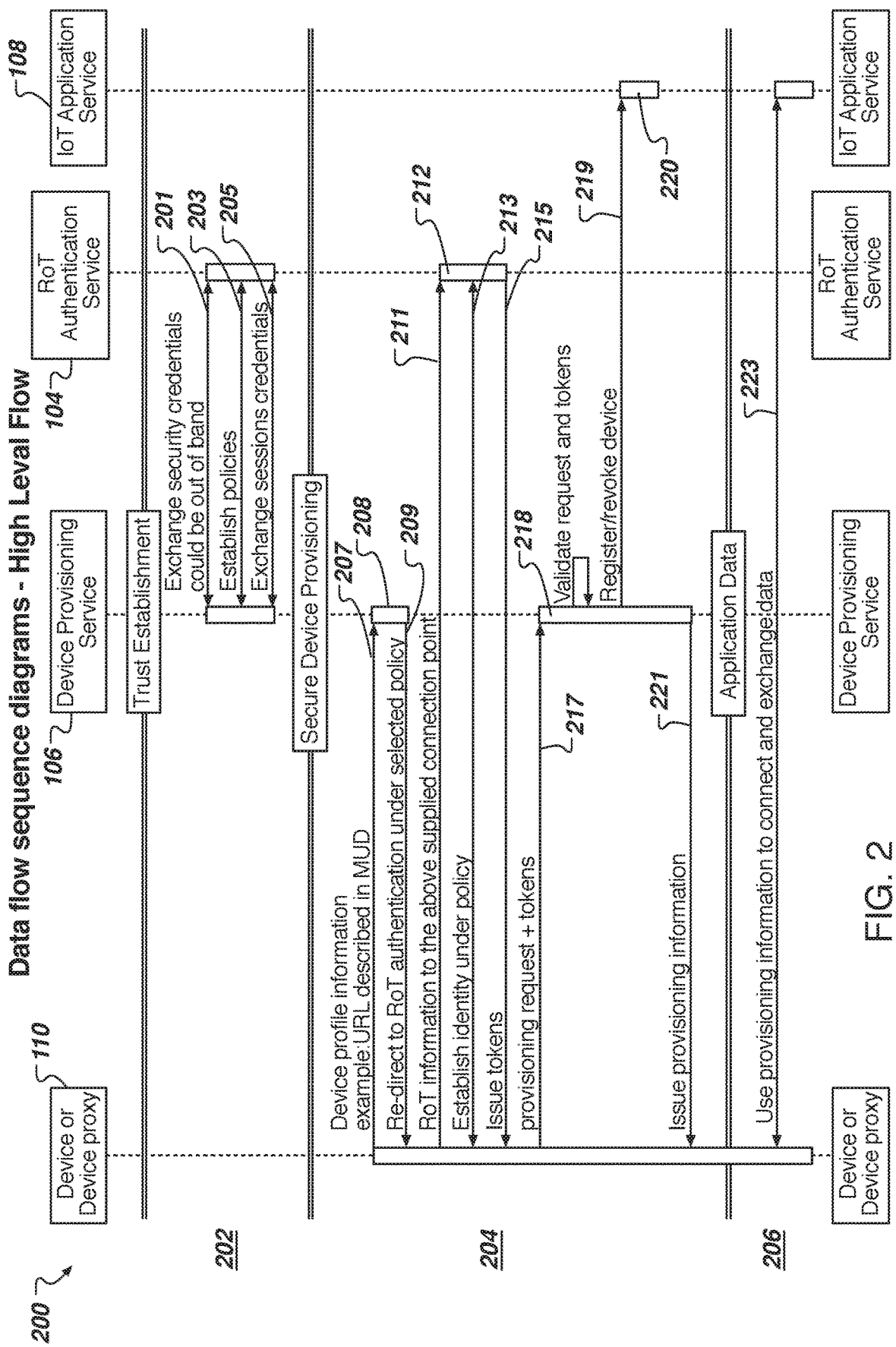
FIG. 2 is a flow diagram illustrating a data flow sequence of an IDM system according to one embodiment.
Figure 3A:
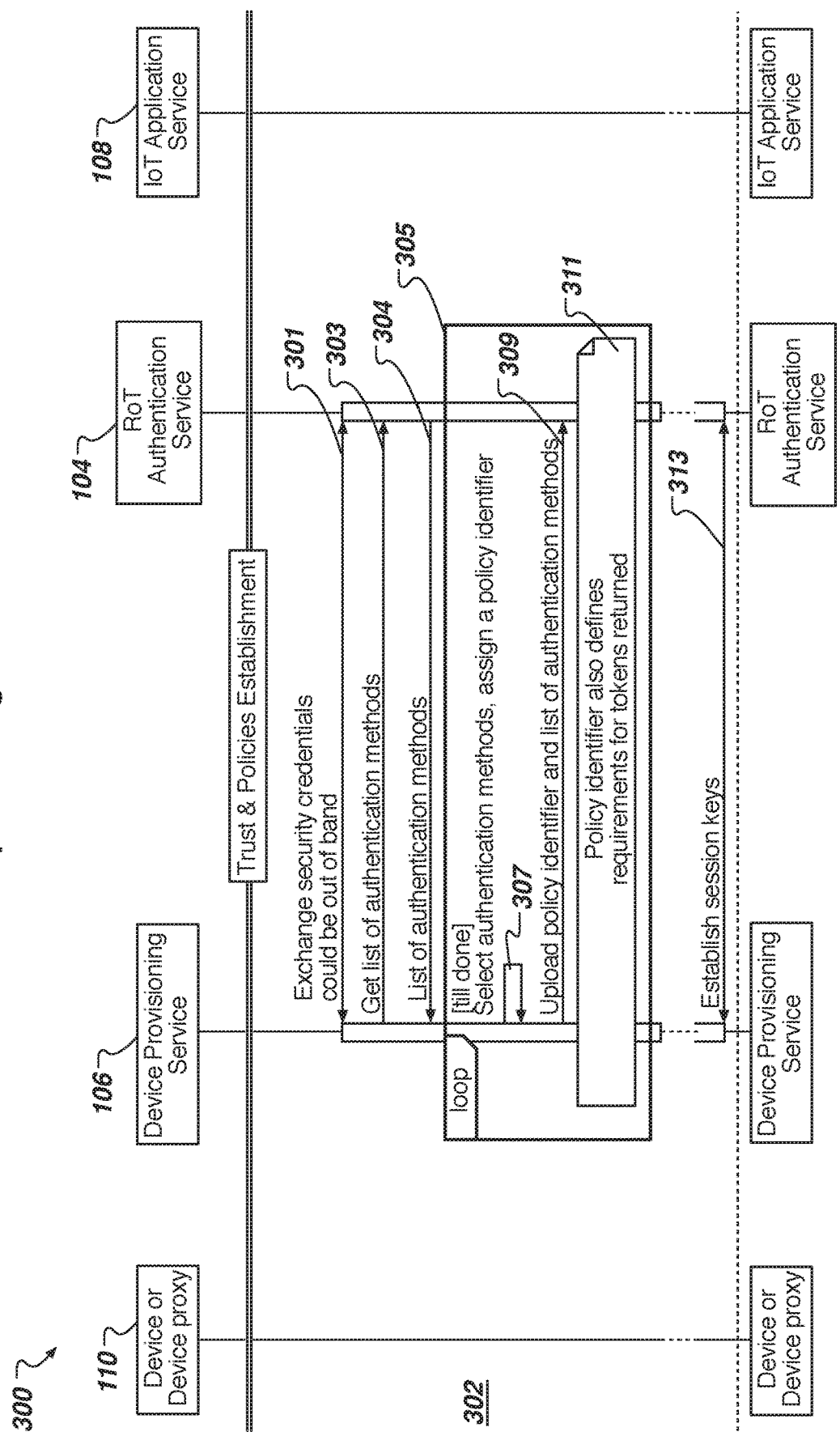
FIG. 3A is a flow diagram illustrating a data flow sequence between a device provisioning service and a RoT authentication service during a trust and policy establishment stage according to one embodiment.
Figure 3B:
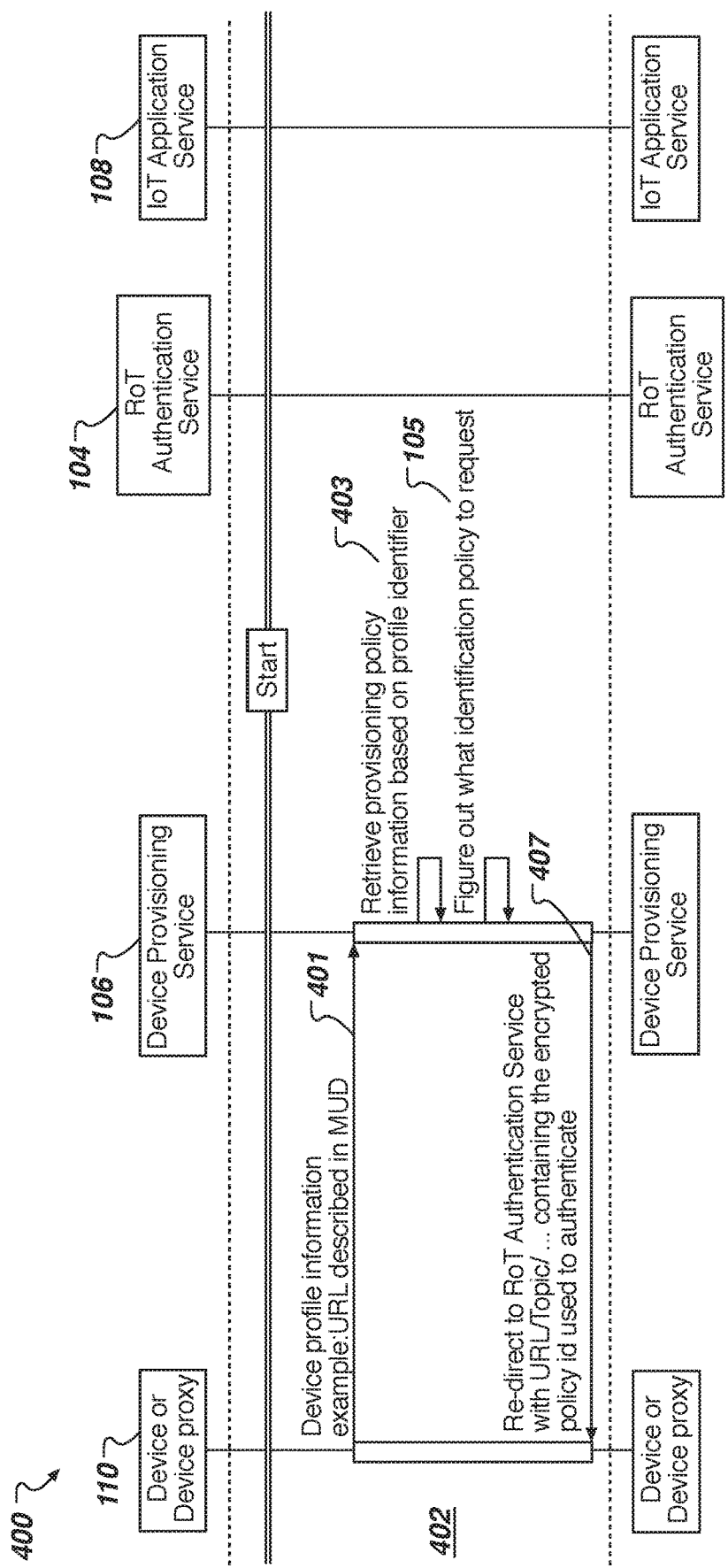
FIG. 3B is a flow diagram illustrating a data flow sequence between an IoT device and the device provisioning service during a device provisioning stage according to one embodiment.
Figure 3C:
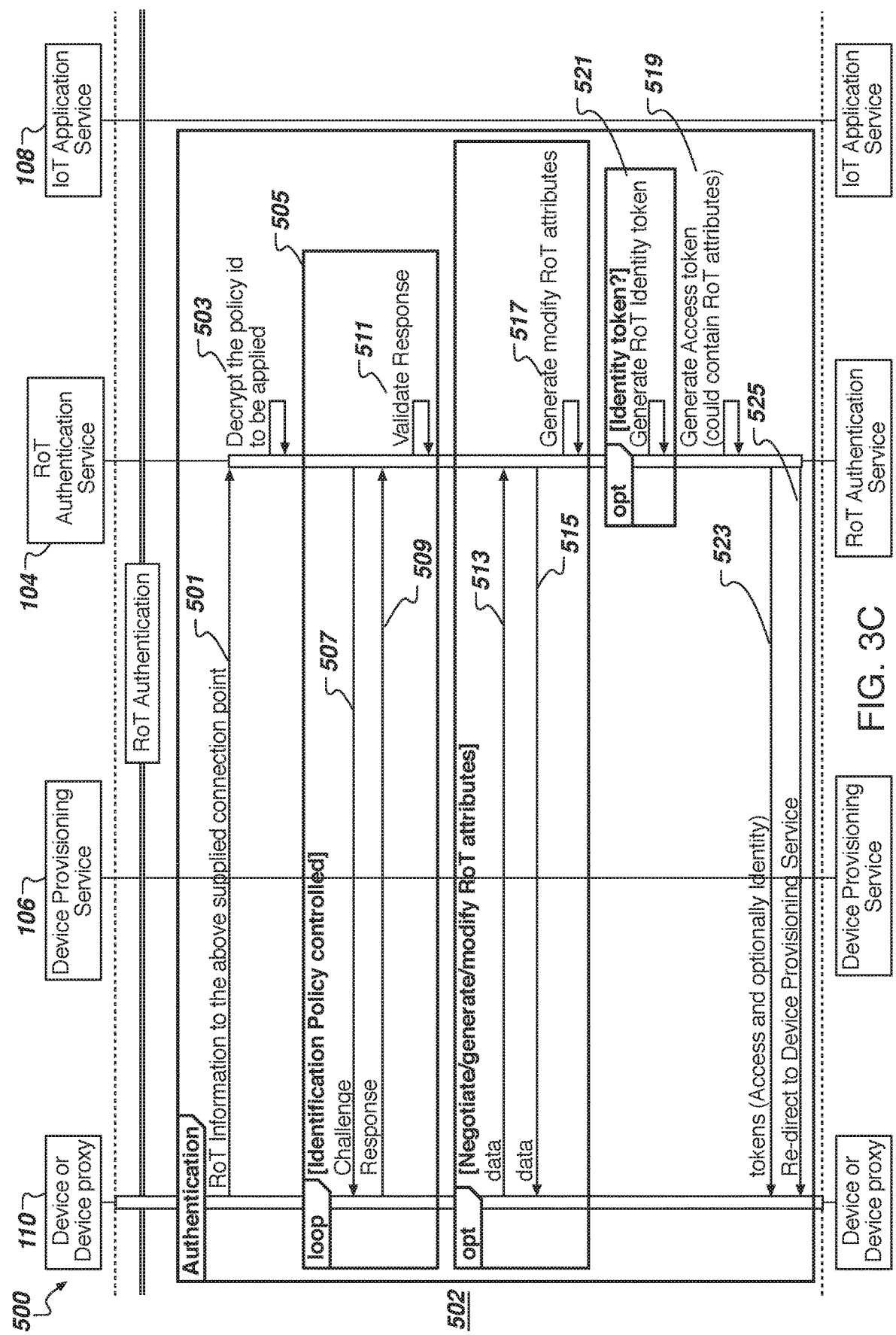
FIG. 3C is a flow diagram illustrating a data flow sequence between an IoT device and the RoT authentication service during an authentication process of the device provisioning stage according to one embodiment.
Figure 3D:
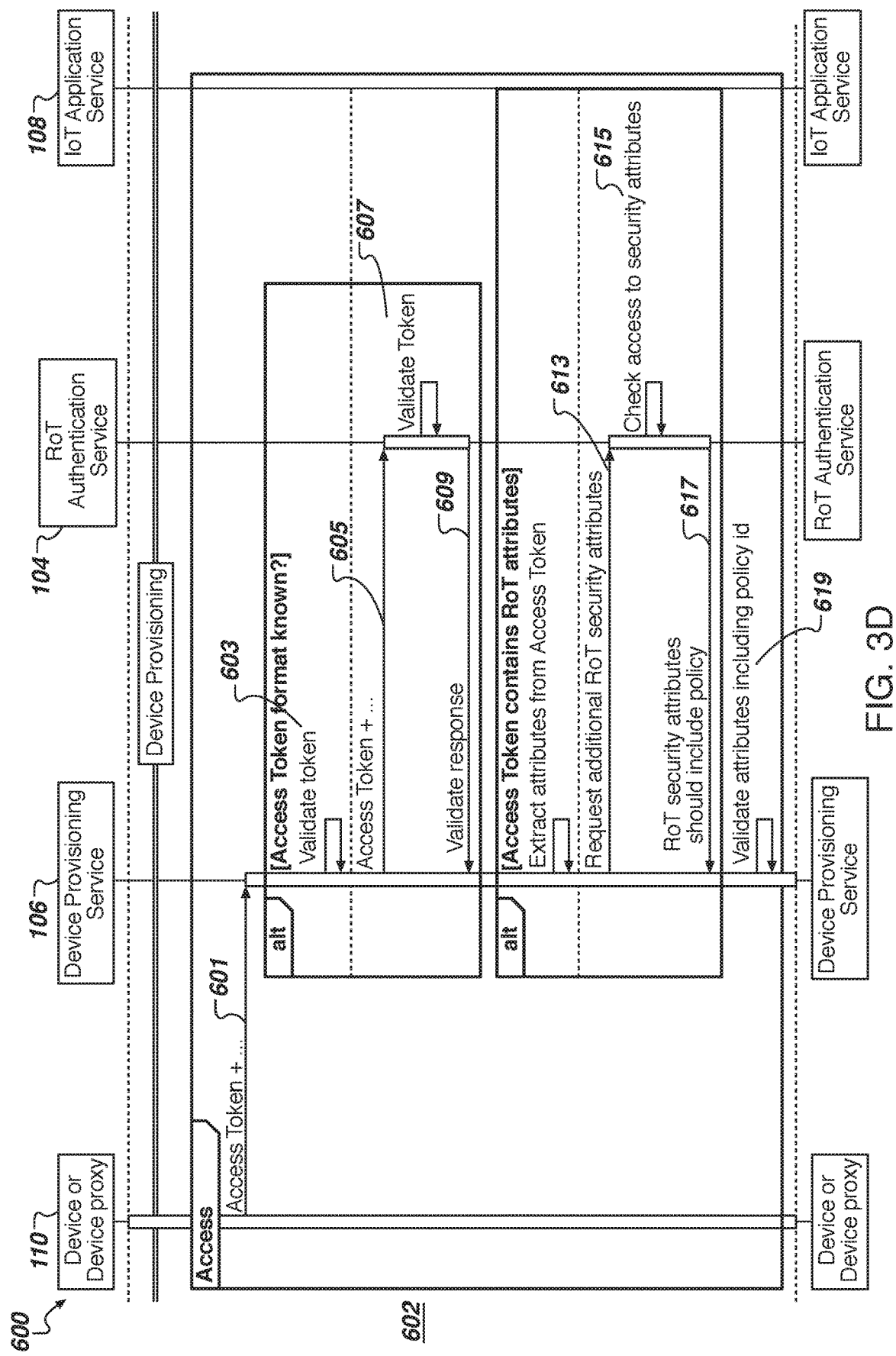
FIG. 3D is a flow diagram illustrating a data flow sequence between an IoT device, the device provisioning service, and the RoT authentication service during an access process of the device provisioning stage according to one embodiment.
Figure 3E:
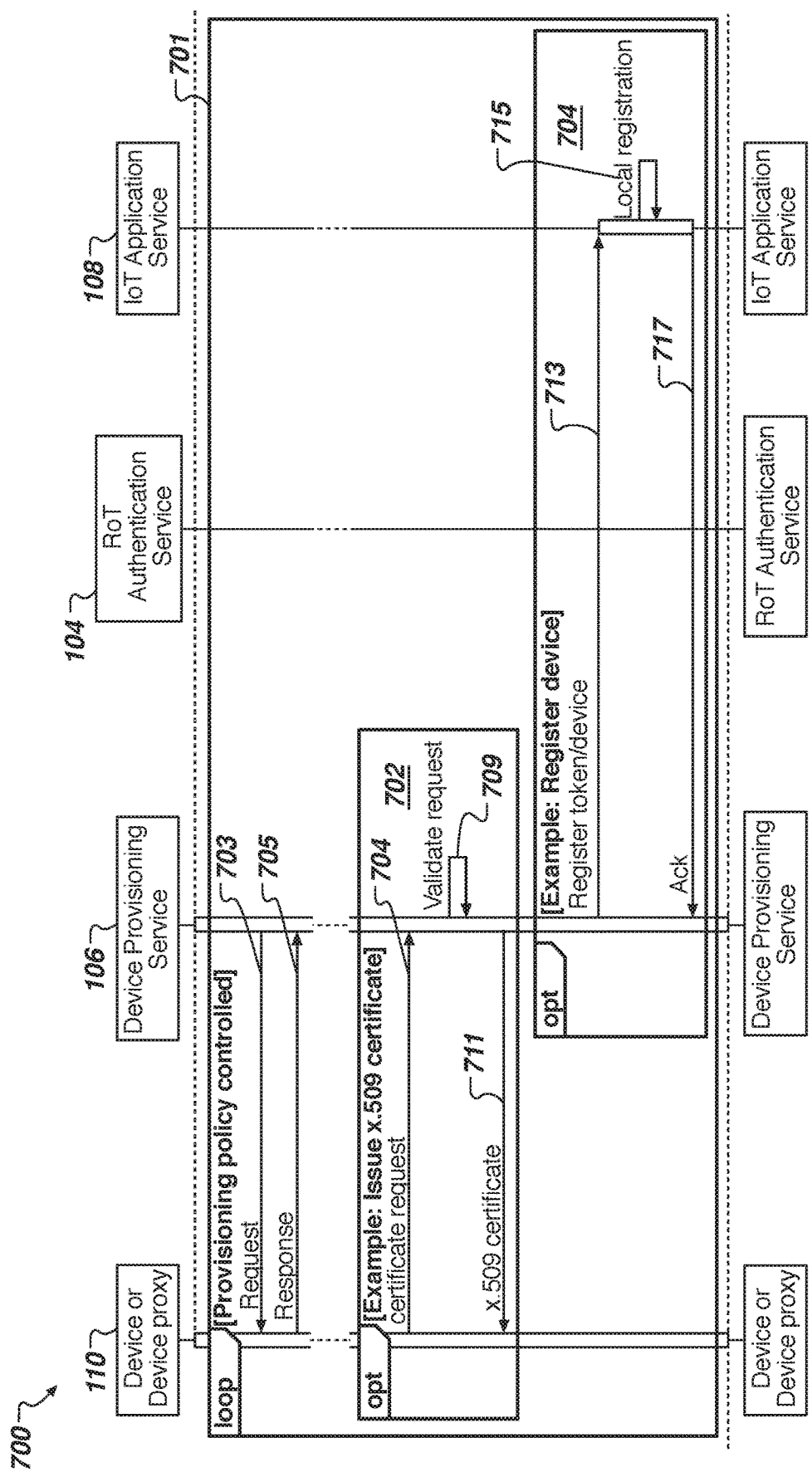
FIG. 3E is a flow diagram illustrating a data flow sequence between an IoT device, the device provisioning service, and the IoT application service for a certificate process and a registration process during the device provisioning stage according to one embodiment.
Figure 3F:
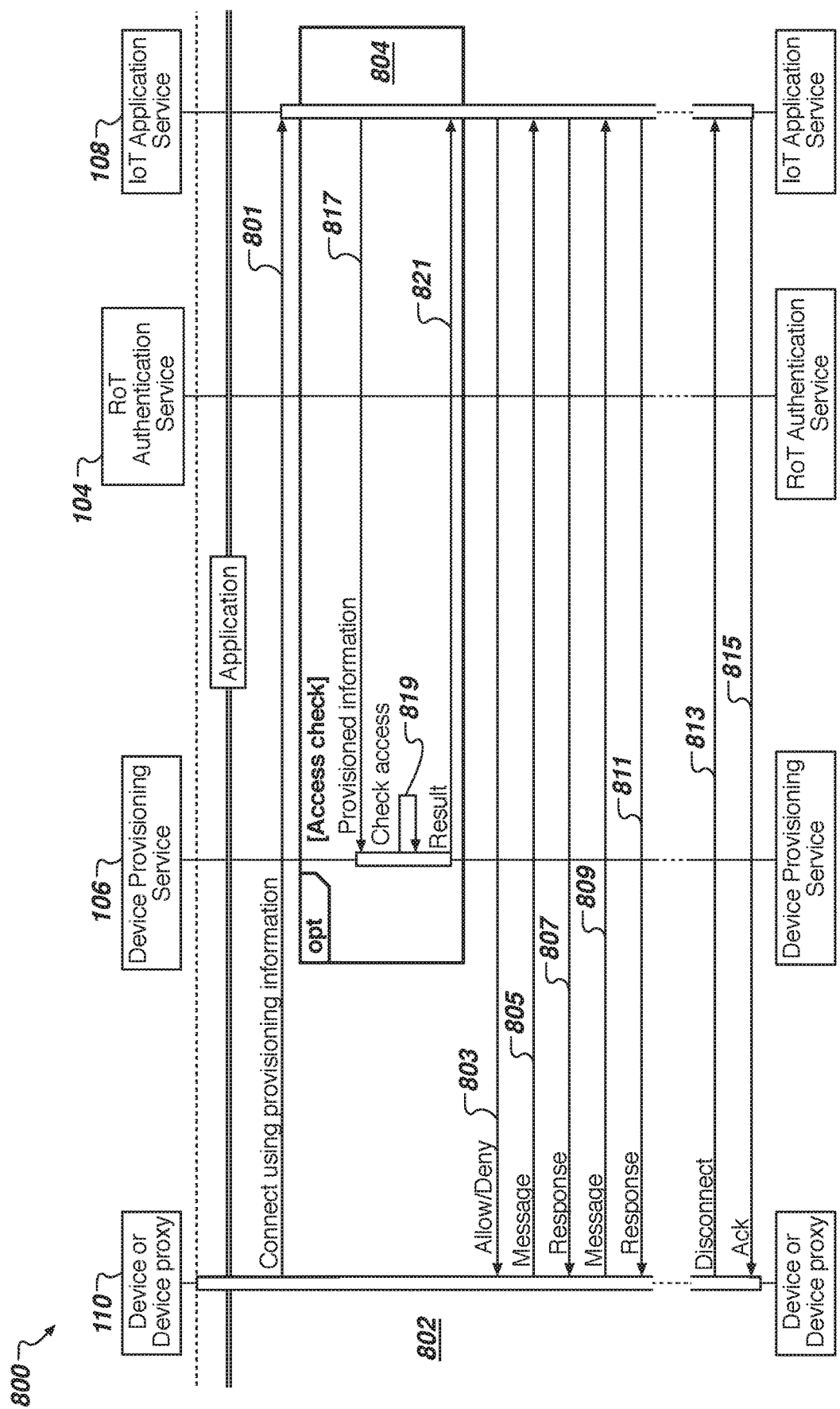
FIG. 3F is a flow diagram illustrating a data flow sequence between an IoT device, the device provisioning service, and the IoT application service during an application data stage according to one embodiment.

FIGS. 2-3F are data flow sequence diagrams that illustrate the data flow between the various components of FIG. 1. For the data flow sequence diagrams, there are references to authentication token request, identity tokens, and access tokens. The authentication token request may be client requests (i.e., IoT device 110) for tokens from the RoT identity server 114 (e.g., Open IoT identity connect server). Depending on the scope of the request, the RoT identity server 114 can return an identity token, an access token, or both. The identity token may represent the outcome of an authentication process and protocol. The identity token can contain an identifier for the RoT of the IoT device 110. The identity token can contain additional information about the RoT (e.g., metadata about the device, the kernel, the operating system) and details on how the RoT is authenticated at the authentication service. The access token can allow access to a resource, such as the resource being RoT attributes about the RoT. Access tokens can contain information about the RoT. The information can be considered metadata about the IoT device 110, a kernel of the IoT device 110, an operating system (OS), or the like. External services use the information (metadata) about the RoT to access to the RoT attributes.

The embodiments described with respect to FIGS. 2-3F are directed to an approach to address the initial establishment of the device credentials in an IoT setting. The embodiments are directed to unifying secure credential establishment regardless of the endpoint type, thus addressing the challenge of a great diversity among IoT devices. This approach is designed to address a challenge of initial trusted enrollment of the IoT endpoints into a secure infrastructure, which allows secure communications between the devices in the IoT environment.

FIG. 2 is a flow diagram illustrating a data flow sequence 200 of an IDM system according to one embodiment. The data flow sequence 200 is broken down into a trust establishment stage 202, a secure device provisioning stage 204, and an application data stage 206. During the trust establishment stage 202, the device provisioning service 106 and the RoT authentication service 104 exchange security credentials 201, establish policies 203, and optionally exchange session credentials 205 over a communication channel. The communication channel can be a secure communication channel and can be an out-of-band communication channel to provide additional security. The established policies can include the decision logic used to determine whether to provision the IoT device 110, whether to authenticate the IoT device 110, whether to authorize the IoT device 110, or the like.

During the secure device provisioning stage 204, the IoT device 110 sends a request with device profile information 207 to the device provisioning service 106. The device profile information 207 can include a uniform resource locator (URL) described in a manufacturer usage description (MUD) file. The MUD file can describe how to interact with a particular device. The MUD file can include a profile identifier. The MUD file can also specify which RoT authentication service to use so that the RoT authentication service has the computations for the particular RoT of the IoT device. At block 208, the device provisioning service 106 can determine from the device profile information 207 an authentication method to be used to authenticate the IoT device 110 by the RoT authentication service 104. The authentication method can have an associated identification policy identifier. Also, at block 208, the device provisioning service 106 can encode the identification policy identifier in the URL in a redirect response 209. The device provisioning service 106 sends the redirect response 209 to IoT device 110 to redirect the IoT device 110 to the RoT authentication service 104 as specified in the selected policy. For example, the redirect response 209 may include a connection point for the IoT device 110 to connect to the RoT authentication service 104. The IoT device 110 sends the RoT information to the RoT authentication service 104 (i.e., to the specified connection point in the redirect response 209). At block 212, the RoT authentication service 104 identifies the policy and determines the requirements under the policy to establish the identity of the IoT device 110 and potentially issue a token (e.g., access token) to the IoT device 110. The RoT authentication service 104 may evaluate whether the device has the correct RoT information. The RoT authentication service 104 and the IoT device 110 establish the identity 213 according to the specified policy, and when the identity 213 is established according to the policy, the RoT authentication service 104 issues a token 215 according to the policy. The RoT authentication service 104 or the device provisioning service 106 can send a challenge, as well as the MAC and evaluate the responses to validate the IoT device 100. The token 215 may be an access token or an access token and an identity token as described herein. Then, the IoT device 110 sends a provisioning request with the token 217 to the device provisioning service 106. At block 218, the device provisioning service 106 validates the request and token. The device provisioning service 106 can optionally send a message 219 to the IoT application service 108 to register or revoke the IoT device 110 with the IoT application service 108. The MUD file may specify whether the device provisioning service 106 should register the IoT device 110, as well as which IoT application service 108 to register the IoT device 110, such as where the device provisioning service 106 should connect to register the IoT device 110. The IoT application service 108 can provide a registry or a registration service that is added by the RoT authentication service to be aware and inform the IoT application services 108 of the credentials for particular IoT devices 110. At block 218, if the request and token is validated, the device provisioning service 106 issues provisioning information 221 to the IoT device 110.

During the application data stage 206, the IoT device 110 and the IoT application service 108 use the provisioning information 221 to connect and exchange data 223.

The data flow sequence 200 of the IDM system may be considered a delegated authentication system since the authentication is delegated by the IoT application service 108 to the RoT authentication service 104 (and/or in connection with the device provisioning service 106).

FIG. 3A is a flow diagram illustrating a data flow sequence 300 between a device provisioning service 106 and a RoT authentication service 104 during a trust and policy establishment stage 302 according to one embodiment. During the trust and policy establishment stage 302, the device provisioning service 106 and the RoT authentication service 104 exchange security credentials 301. The security credentials 301 may include keys, MACs, or the like to establish a secure connection between the device provisioning service 106 and the RoT authentication service 104. The device provisioning service 106 and the RoT authentication service 104 can exchange security credentials over a communication channel. The communication channel can be a secure communication channel. The secure communication channel can be an out-of-band communication channel to be more secure. The device provisioning service 106 can request 303 a list of authentication methods from the RoT authentication service 104 and the RoT authentication service 104 can respond 304 with the list of authentication methods. For example, for a given class of IoT devices, a specific authentication method may be used, whereas a different class of IoT devices may use a different authentication method. For each of the authentication methods in the list, the device provisioning service 106 can use a loop 305 to select 307 each of the authentication methods and assign each a policy identifier. The policy identifier can be encrypted in the URL of the redirect response. For each authentication method, the device provisioning service 106 can upload the policy identifier 309 and the list of authentication methods to the RoT authentication service 104. The policy identifiers also can define the requirements 311 for tokens returned to the IoT devices 311 when validated. The device provisioning service 106 and the RoT authentication service 104 can also exchange session keys 313.

FIG. 3B is a flow diagram illustrating a data flow sequence 400 between an IoT device and the device provisioning service 106 during a secure device provisioning stage 402 according to one embodiment. During the secure device provisioning stage 402, the IoT device 100 sends the device profile information 401 (e.g., URL described in MUD) to the device provisioning service 106. The device provisioning service 106 retrieves the provisioning policy information 403 based on the profile identifier in the profile information 401. The device provisioning service 106 determines what identification policy to request 405 and sends a redirect response 407 to the IoT device 110. The redirect response 407 may redirect the IoT device 110 to the RoT authentication service 104 with a URL containing the encrypted policy identifier used to authentication (e.g., URL/Topic/ . . . ). It should be noted that the provisioning policy describes under which circumstances and what to provision into the device as a result of the entire interaction between the device and the ISS backend. The identification policy describes to the backend of the ISS infrastructure how to authenticate a device. The latter is needed, since there may be several ways in which devices are authenticated (such as multiple key databases), depending on the type of the device, for example.

FIG. 3C is a flow diagram illustrating a data flow sequence between an IoT device and the RoT authentication service during a RoT authentication process 502 of the secure device provisioning stage according to one embodiment. The IoT device 110 sends the RoT information 501 to the RoT authentication service 104 (e.g., using the supplied connection point in the redirect from the device provisioning service 106). At block 503, the RoT authentication service 140 decrypts the policy identifier (if encrypted in the URL) to be applied. The RoT authentication service 104 sends a challenge 507 to the IoT device 110 and the IoT device 110 sends a response 509 back to the RoT authentication service 104. At block 511, the RoT authentication service 104 validates the response. The RoT authentication service 104 can perform challenges and responses in a loop 505 for each policy specified in the policy associated with the policy identifier. Loop 505 can be initiated by the provisioning policy service and involves RoT Authentication Service (a.k.a RoT Identity Server). However, in an alternative embodiment the challenge can be issued and verified by the RoT Authentication Service. Although this flow is not illustrated, it could be more complex, but fundamentally could achieve the same token issuance based on the device authentication challenge/response.

In another embodiment, the IoT device 110 optionally sends data 513 to the RoT authentication service 104 to negotiate, generate, or modify RoT attributes. The RoT authentication service 104 can send data 515 back to the IoT device 110 and generate or modify the RoT attributes at block 517, if permitted.

Continuing in the authentication process after the identification policy (or policies) is validated, the RoT authentication service 104 generates an access token at block 519. In another embodiment, the RoT authentication service 104 can optionally generate a RoT identity token at block 521. The RoT authentication service 104 sends the token(s) 523 (access token at block 519 and optional identity token at block 521) to the IoT device 110. The RoT authentication service 104 also sends a redirect response 525 to the IoT device 110. The redirect response 525 can redirect the IoT device 100 to the IoT application service 108.

FIG. 3D is a flow diagram illustrating a data flow sequence between an IoT device, the device provisioning service, and the RoT authentication service during an access process 602 of the secure device provisioning stage according to one embodiment. During the access process 602, the IoT device 110 can send a request 601 with the access token to the device provisioning service 106. In one embodiment, the device provisioning service 106 validates the token 603 and sends the access token to the RoT authentication service 104. The RoT authentication service 104 validates the access token 607 and sends the validation response 609 to the device provisioning service 106. In another embodiment, the device provisioning service 106 extracts attributes from the access token 611 and sends a request 613 to request additional RoT security information from the RoT authentication service 104. The RoT authentication service 104 checks access to the security attributes 615 and sends the RoT security attributes back to the device provisioning service 106. The RoT security attributes should include a policy identifier. Continuing in the access process 602, the device provisioning service 106 validates the security attributes 619, including the policy identifier.

FIG. 3E is a flow diagram illustrating a data flow sequence between an IoT device 110, the device provisioning service 106, and the IoT application service 108 for a certificate process and a registration process during the secure device provisioning stage according to one embodiment. As part of a loop 701 in which the device provisioning service 106 sends a request 703 and receives a response 705 from the IoT device 110, the certificate process 702, and optional registration process 704 may be performed.

In the certificate process 702, the IoT device 110 can send a certificate request 707 to the device provisioning service 106. The device provisioning service 106 validates 709 the certificate request and sends a certificate 711 to the IoT device 110. However, if the device provisioning service 106 does not validate the certificate request, the certificate 711 is not sent to the IoT device 110.

In the registration process 704, the device provisioning service 106 sends a request 713 to the IoT application service 108 to register the IoT device 110 or its associated access token. The IoT application service 108 performs local registration 715 for the request 713. As part of the registration process 704, the IoT application service 108 can also send an acknowledgment response (ACK) 717 to the device provisioning service 106.

FIG. 3F is a flow diagram illustrating a data flow sequence between an IoT device 110, the device provisioning service 106, and the IoT application service 108 during an application data stage 802 according to one embodiment. During the application data stage 802, the IoT device 110 can connect with the IoT application service 108 by sending a request 801 with the provisioning information. The IoT application service 108 can allow or deny 803 the request. The IoT device 110 can send subsequent messages 805, 809 to the IoT application service 108 and receive respective responses 807, 811 from the IoT application service 108. When the IoT device 110 is done accessing the IoT application service 108 (e.g., no longer accessing the IoT application), the IoT device 110 can send a request 813 to disconnect from the IoT application service. The IoT application service 108 can send an acknowledgement response 815 (ACK).

In another embodiment, the IoT application service 108 can perform an access check 804 to determine if the IoT device 110 is on a blacklist or whitelist. In one embodiment, the IoT application service 108 sends a request 817 to the device provisioning service 106 with the provisioned information. The device provisioning service 106 checks whether this IoT device 110 has access 819, and sends the result 821 back to the IoT application service 108. The access check 804 can be a pull-based model, as illustrated. Alternatively, the access check 804 can be a push-based model.

In some embodiments, the IoT device 110 includes a cryptographic manager (CM) core and may be referred to as a CM core device. The CM core may operate as a proxy for the device. The CM Core is a hardware core capable of executing a set of commands. Sequences may be digitally signed and/or carry other cryptographic demonstrations of validity (e.g. a MAC), which the CM Core can verify to confirm the original and validity of the sequences. This provides control over what data will be accepted (and which operations will be executed) by the CM Core, even if the communication channel used to deliver the sequences is untrusted. In one embodiment, the CM Cores are Crypto-Manager™ cores. The CryptoManager™ core is a hardware core that provides cryptographic control of feature activation, configuration management, and secure key management. The CryptoManager™ core may be integrated into System on Chip (SoC) designs and may be accessed via a register interface located on the SoC main bus. The Module is a program, containing both the instructions and the data, execution of which results in a secure construction of a Sequence. The Sequence may be binary data produced by a Module that is running on a hardware security module (HSM) within a Delegate Appliance device and consumed by the CM Core.

In one embodiment, the CM core may provide secure transaction processing with the respective services to establish IoT identification and RoT authentication and authorization as described herein. The IoT devices 110 can be manufactured and/or managed by fabless semiconductor vendors that produce chipsets for mobile devices, system integrators (OEMs) that manufacture mobile internet connected devices, and mobile network operators (MNOs) that deploy these devices on their wireless networks, etc. These companies may contract out some of the fabrication of their devices or components to third-party manufacturers that operating remote manufacturing facilities, such as a high-volume manufacturing site. As a mission critical part of the customer's manufacturing and communications systems, design priorities for the infrastructure are high availability and integrity. Given the variety of IoT devices and the often limiting computing resources, the embodiments described herein may provide the high availability and integrity using the RoT identity, authentication, and authorization processes described above with respect to FIGS. 1-3F. In one embodiment, the RoT authentication service 104 (and is associated servers) can act as the entity which protects master keys and authorizes installation, configuration, and operation of the IoT devices 110 with the IoT application services 108. Each of the devices may include a HSM that can operate as a vault safeguarding sensitive data and as a platform for execution commands or operations associated with the sensitive data. The sensitive data may be tokens, keys, serial numbers, device-specific information, firmware, or the like.

It should be noted that various portions of the description refer to components, devices, or services as logical entities. Sometimes the internal structure of a logical entity is important. For example, a service may include multiple servers, a shared file system, a shared database, or the like. In the contexts where internals of the services are important and each of these servers is viewed as a logical entity, each of them is referred to as a separate server device to distinguish it from the other devices that may perform different operations. Each server or device may include a main computing device (e.g., processor or the like) as well as an optional embedded HSM. Some of the IDs and keys will be stored inside the HSM, while others will be stored on the device's hard drive. Exact location of the IDs or keys is determined based on their sensitivity and the implementation details as described herein. IDs are used to identify components within the infrastructure. It should also be noted that various processes or data flows described above with respect to FIGS. 2-3F may be performed by processing logic that may comprise hardware (e.g., circuitry, dedicated logic, programmable logic, microcode, etc.), software, firmware, or a combination thereof.

In another embodiment, a system for authenticating a device to an application service includes a) a device with a hardware/software root of trust that stores a cryptographic material; b) an authentication service (RoT Authentication service) that has the same or a counterpart to the cryptographic material on the device; and c) an application service which would like to authenticate the device in different modes before allowing access to its services. The authentication service associates the cryptographic material with an additional set of attributes. These attributes include session keys, sequences, secure programs capable of being executed on the hardware root of trust, derived keys, remote function call encoded as data, and other data. In a further embodiment, the device connects to the application services wanting to access the service and the application service redirects the device to authenticate against the authentication service under a pre-negotiated policy. In a further embodiment, the authentication service uses a secure protocol to authenticate the device to confirm that it satisfies the policy attributes, the device and authentication service update the attributes using the root of trust for attesting the same, and the authentication service returns secure, potentially multiple, token(s) to bind identity as well as access information to the device. The attribute information can either be directly encoded in the token(s) or the token acts as an opaque identifier to allow the application service to fetch the attributes later. The application service can check the token(s) i) are still valid (e.g., tokens could be time bound or require check back with the authentication service); ii) were issued under the requested policy identifier; and iii) valid only for that application service. The application service uses the token(s) to establish the identity of the device and to have access to the attributes needed to provide the requested service. The application service and the authentication service may be operated by different entities.

Described herein are approaches to address a challenge of initial trusted enrollment of the IoT endpoints into a secure infrastructure, which allows secure communications between the devices in the IoT environment. Described below are various embodiments to an approach to address the initial establishment of the device credentials in an IoT setting is proposed. The embodiments of this design is based on the provisioning of the security credentials to the devices at the early stages in their lifecycle, such as SoC manufacturing and subsequent leveraging of these devices to securely enroll devices into a security infrastructure, such as PKI (Public-Key Infrastructure). The infrastructure includes an authentication service and a delegated authentication scheme, allowing, among other things, establishment of new credentials that belong to different parties at various stages of the device's lifecycle. Moreover, the proposed design aims at unifying secure credential establishment regardless of the endpoint type, thus addressing the challenge of a great diversity among IoT devices.

FIGS. 4-15 are flow diagrams illustrating sequences in interactions with the IoT device and devices of the IDM system (also referred to as IoT infrastructure), including three use cases: Authentication, Identity, and Attestation. In Authentication use cases, the provisioning service can verify authenticity of the device with the help of the authentication service. In the Identity use cases, the authentication service either provides a unique device alias to the provisioning service or verifies that the alias provided by the device itself is not duplicated by some other device. All three use cases may use the same base flow set forth in FIG. 9.

Figure 4:
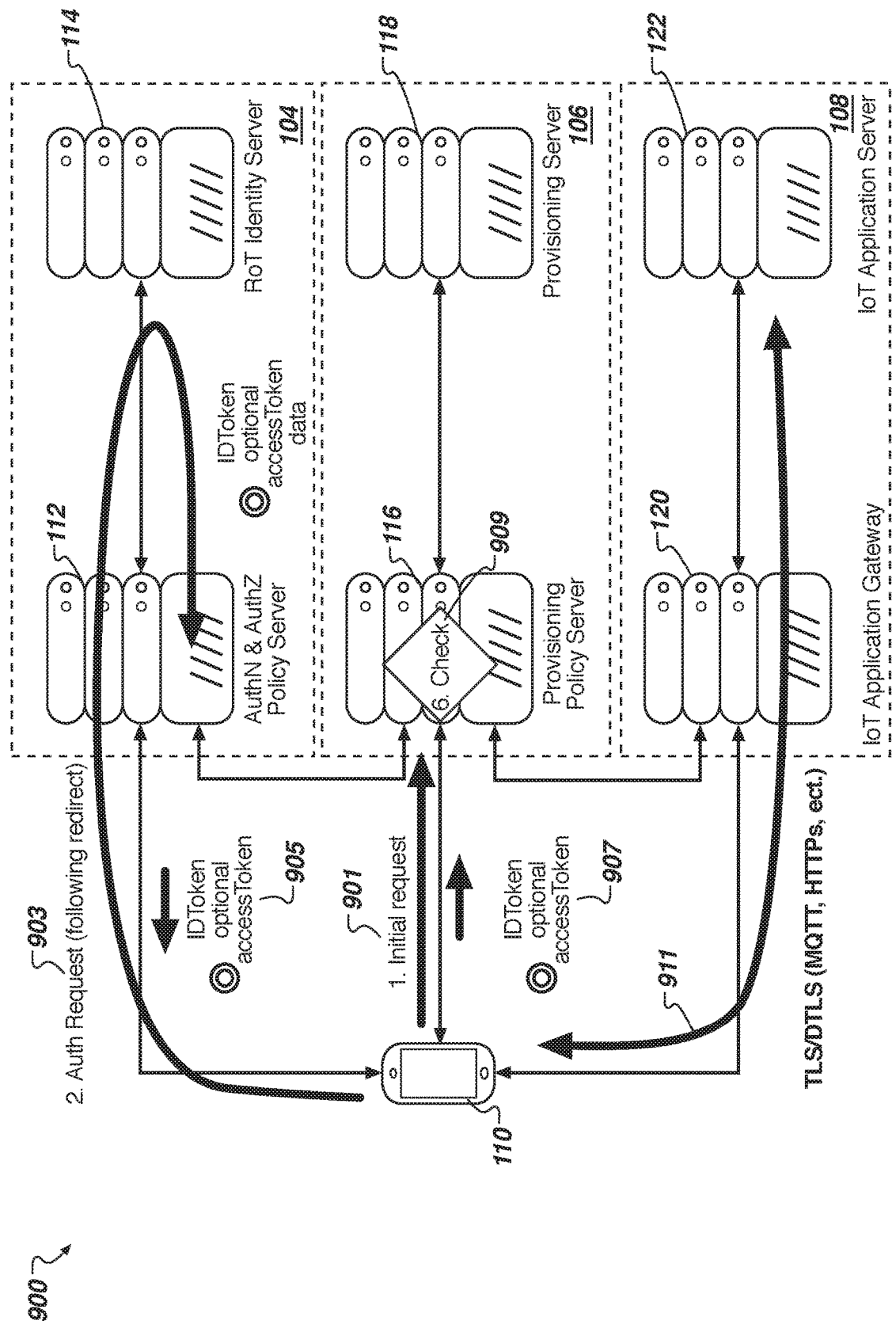
FIG. 4 is a flow diagram illustrating a sequence of interactions between an IoT device, the RoT authentication service, the device provisioning service, and the IoT application service according to one embodiment.

FIG. 4 is a flow diagram illustrating a sequence 900 of interactions between an IoT device 110, the RoT authentication service 104, the device provisioning service 106, and the IoT application service 108 according to one embodiment. The operations resulting in the interactions between devices may be performed by processing logic that may comprise hardware (e.g., circuitry, dedicated logic, programmable logic, microcode, etc.), software, firmware, or a combination thereof. The sequence 900 may start with an initial request 901 from the IoT device 110 to the front-end provisioning policy server 116 of the device provisioning services 106. The front-end provisioning policy server 116 can redirect the IoT device 110 to the authentication policy server 112 by sending a redirect response back to the IoT device 110 in response to the initial request 901. The IoT device 110 can send an authentication request 903, following the redirect, to the authentication policy server 112 of the RoT authentication service 104. The authentication policy server 112 sends the authentication request 903 to the RoT identity server 114 and receives an identity token and optional access token data in response. The authentication policy server 112 sends the identity token 905, and the optional access token data, back to the IoT device 110. The IoT device 110 sends the identity token 907 (and the optional access token data) to the front-end provisioning policy server 116. At block 909, the front-end provisioning policy server 116 checks the identity token 907 before sending a provisioning request to the provisioning server 118.

It should be noted that the protocol described herein has some similarities to the OpenID connection (OIDC) protocol, but differs in a number of ways. For example, in the protocol used, the identity tokens are used for IoT devices and neither for users nor user agents. At its basis, the device attempts to access the device provisioning service 106, which uses a separate service (RoT Identity server 114) to authenticate the device. It is also designed to eliminate (or at least minimize when it is not possible) a holding state anywhere in the system. In particular, this protocol reduces the exchange of nonces in both directions, which simplifies processing of messages coming from multiple devices. There are still nonces, but they are sent from server to server via the client. In particular, a nonce is shared from the provisioning policy server 116 to the IoT device 110. If replay protection was to be performed for every exchange, a few more nonces would be needed. Security functionality, namely replay protection, which is typically provided by use of a nonce, is instead being provided by relying on secure transport between the IoT device and backend servers. Specifically, this transport is required to be a server-authenticated TLS protocol. After identification (and authentication), the IoT device 110 can communicate data 911 with the IoT application service 108 over a connection, such as TLS/DTSL (MQTT, HTTPs, etc.) as described herein.

Figure 5:
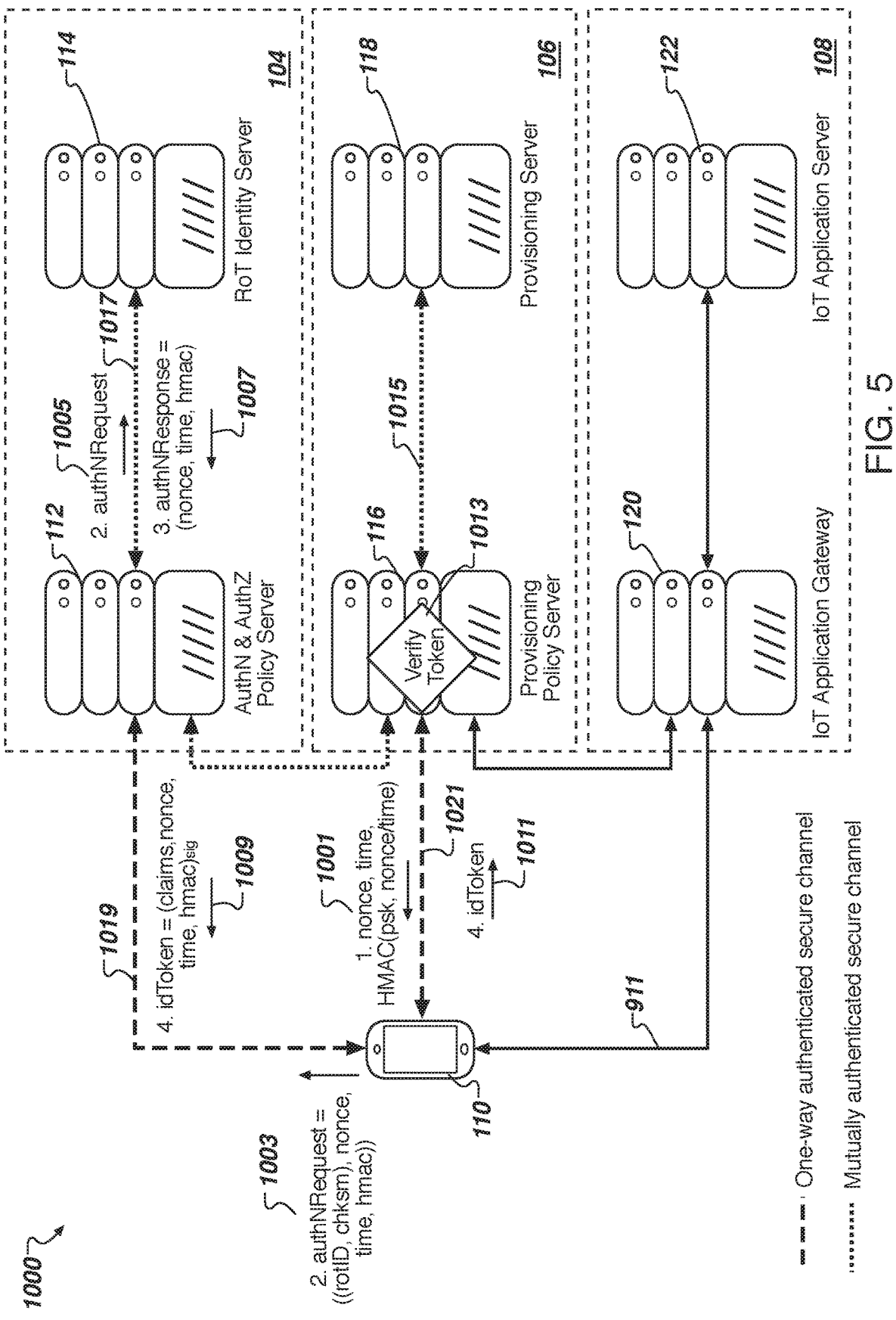
FIG. 5 is a flow diagram illustrating a sequence of messages exchanged between the IoT device, the RoT authentication service, the device provisioning service, and the IoT application service for authentication and identity services according to one embodiment.

FIG. 5 describes messages exchanged between the entities in the exchange that combines use cases of authentication and issuance of the domain-specific identity to the device.

FIG. 5 is a flow diagram illustrating a sequence 1000 of messages exchanged between the IoT device 110, the RoT authentication service 104, the device provisioning service 106, and the IoT application service 108 for authentication and identity services according to one embodiment. The sequence 1000 may start with the provisioning policy server 116 sending a redirect response 1001 to the IoT device 110 in response to an initial request from the IoT device 110 (not illustrated). The redirect response 1001 may include a nonce, a timestamp (or other time information, and a hash of a message authentication code (HMAC or hmac), including a pre-shared key (PSK) and a nonce/time. The PSK can be shared between the provisioning policy server 116 and the authentication policy server 112. The nonce may be a random value selected by the provisioning policy server 116.

In response to the redirect response 1001, the IoT device 110 generates an authentication request 1003 to send to the authentication policy server 112. The authentication request 1003 may include a RoT identifier (rotID), which is an immutable root-of-trust ID), a checksum, the nonce, the time stamp, and the HMAC. The checksum (chksum) is a checksum computed over a derived root key (rotKey), rotID, the nonce, and the timestamp. The rotKey is derived using a key tree. The key tree has a base key and a path. The path defines how the base key is transformed into the rotKey. The checksum can be computing using hash1 and hash2 primitives from a CM core of the IoT device 110. Similarly, the MAC can be a combination of the hash1 and hash2 primitives. More generally, any keyed MAC (HMAC) can perform a similar operation. The idea is that rather than sharing the actual unique core (RoT) key with the backend, a solution-specific key can be derived any time the backend interacts with the core. This derivation is done by hashing the unique core key with a constant.

In one embodiment, the authentication request 1003 is a HTTP redirect as follows:

```
POST/ProvisionMe?response_type=code&scope=authn
   HTTP/1.1
Host: provisioner.iotProvider.com
Accept: application/json
{"DeviceData": "AAEC ...AwQFBgc="}
```

The authentication policy server 112 receives the authentication request 1003 and sends the authentication request 1003 along to the RoT identity server 114 as authentication request 1005. The RoT identity server 114 responds with an authentication response 1007, the authentication response 1007 including the nonce, the timestamp, and the HMAC. The authentication policy server 112 receives the authentication response 1007. Assuming the authentication response 1007 validates the authentication request 1005, the authentication policy server 112 provides an identity token (idToken) 1009 to the IoT device 110. The idToken may include the nonce, the timestamp, and the HMAC, as well as claims. The attestation data (attData) may contain the data from the device describing its attributes, which is attested to by the root-of-trust within the device. Claims, on the other hand, are attributes of the device, which are provided and attested to by the backend (RoT Authentication Server). The claims would typically include attData, but may have other information, such as how many times this device has been authenticated by the backend in the last hour. The nonce, timestamp, HMAC, and claims may be digitally signed. The IoT device 110 submits the identity token 1009 to the provisioning policy server 116 as the identity token 1011. In one embodiment, the following is an example identity token:

```
{
"iss": https://authn.rambus.com,
"sub": "alias1234",
"aud": iotProvider1",
"exp": 1311281970,
"iat": 1311280970,
"auth_time": 1311280969,
"amr": "urn:rambuscmv1",
"nonce": "AWFQ ... Gwcg=",
"req_time": 1311280802,
"mac": "AABc ... CQEfcg="
}
```

The provisioning policy server 116 verifies the identity token 1011 at block 1013. To verify the identity token 1011, the provisioning policy server 116 can communicate with the provisioning server 118 over a mutually authenticated secure channel 1015. Similarly, the authentication policy server 112 and the RoT identity server 114 can communicate over a mutually authenticated secure channel 1017. The IoT device 110 and the authentication policy server 112 communicate over a one-way authenticated secure channel 1019 and the IoT device and the provisioning policy server 116 communicate over a one-way authenticated secure channel 1021. The provisioning policy server 116 can communicate with the authentication policy server 112 over a mutually authenticated secure channel 1023.

It should be noted that FIG. 5 does not illustrate some preliminary operations, such as deployment of the Modules on the backend, sequence on the device, trust establishment between the backend components, etc., in order to concentrate on the authentication flow and capture details regarding the sequences executed on CM Core and Modules executed in the backend. Moreover, it should be noted that there are multiple IoT devices that are serviced by this single infrastructure, although one IoT device 110 is illustrated and described.

With respect to FIG. 5, this simple configuration relies on the secure channel at the transport layer (TLS) to protect against replay and Man-in-the-Middle attacks and on confidentiality for the immutable id (rotID). An application on the device may contain the Sequence, while the backend uses one single Module in this simple configuration. Additional Sequence may be used by the device provisioning service 106 as a challenge to a CM Core within the IoT device 110 and produce the response. A secure configuration, which does not rely on the security properties of the TLS channel between the IoT device and the services are described below.

In some embodiments, at a high level from this limited security perspective, interactions are initiated by an application when it attempts to contact the provisioning service 106 (e.g., 1001), for which it needs an authentication request (1003). Provisioning policy server 116 responds with a redirect to the authentication policy server 112, which may be an OpenID Connect server (OIDC server) and send some additional data, as illustrated in FIG. 5, such as the nonce, time and an HMAC of nonce and time using a pre-shared key. Subsequently, the IoT device 110 produces the request with the help of the RoT and RoT internal computations. For example, the IoT device 110 can provide the request with the help of the CM Core using a Static Sequence that is a set of commands executed by the CM Core to perform the operation. After the Sequence has been executed, the output, containing the rotID (an identifier of CM Core) and a checksum, are produced by CM Core, in addition to the data received from the provisioning policy server 116 (nonce, time, and HMAC) and forwarded by the application to the OIDC server (e.g., 112). These data items are further forwarded by the authentication policy server 112 to RoT identity server 114, where the HSM Module is executed. Prior to its execution, time and HMAC are verified. Then, rotID is used to lookup derived rotKey (key shared between the core and the infrastructure, corresponding to the device with a given rotID). This value of derived rotKey is used by the Module to verify the checksum. Once that is done, RoT identity server 114 returns to the authentication policy server 112 the authentication response 1007 and the authentication policy server 112 returns a token describing the authentication parameters. This token is an idToken, as specified by OpenID Connect protocol, which includes among other things the identity of the device (its alias). This token is formatted as JSON with token (jwt) and can be signed by the asymmetric key of the authentication policy server 112 (AuthN&AuthZ Policy Server) to be verified by the provisioning policy server 116.

Figure 6:
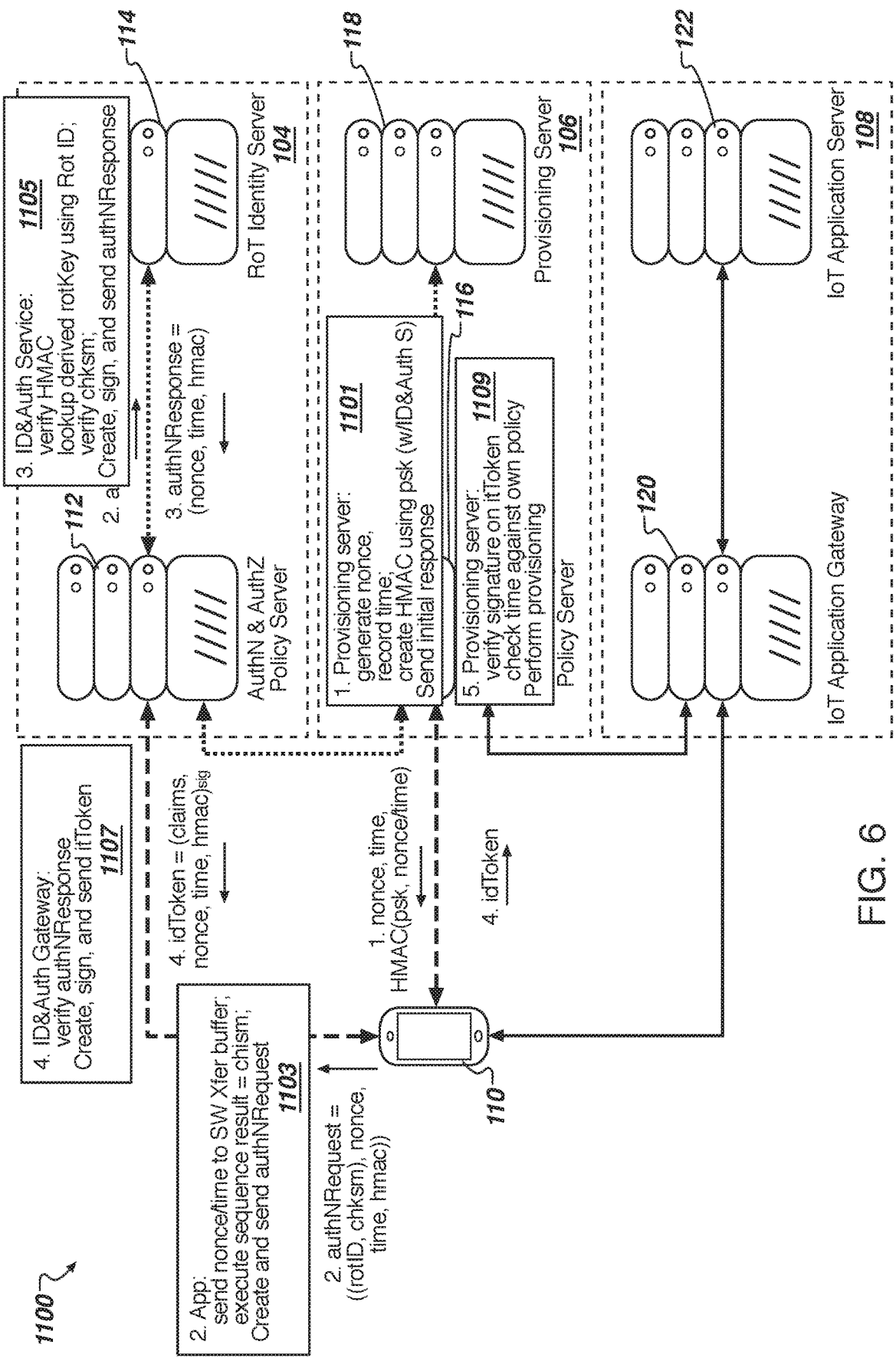
FIG. 6 is a flow diagram illustrating various operations performed on each of the relevant components for the sequence of FIG. 10 according to one embodiment.

FIG. 6 is a flow diagram illustrating various operations performed on each of the relevant components for the sequence 1000 of FIG. 5 according to one embodiment. The provisioning policy server 116 at block 1101, generates the nonce, records the timestamp and creates HMAC using PSK, and sends the initial response (redirect response). The application at the IoT device 110 at block 1103 sends the nonce and timestamp to a buffer of the CM core and executes a sequence to obtain the checksum result. The application, at the block 1103, also creates and sends the authentication request to the RoT identity server 114 via the authentication policy server 112. At block 1105, the RoT identity server 114 verifies the HMAC, looks up the derived rotKey using rotID, and verifies the checksum of the authentication request. The RoT identity server 114 also creates, signs, and sends the authentication response back to the authentication policy server 112. At block 1107, the authentication policy server 112 verifies the authentication request. Upon verification, the authentication policy server 112 creates, signs, and sends the identity token to the application at the IoT device 110. The application at the IoT device 110 sends the identity token back to the provisioning policy server 116, which at block 1109, verifies the signature on the identity token and checks the time against its own policy. The provisioning policy server 116 also performs the provisioning operations.

It should be noted that since in the above flow no state is held by any of the entities and is completely encapsulated in the request or response objects, there is no need to have an explicit identifier for a session identifier (session id). It should also be noted that the request/response objects themselves may be represented by a URL-encoded string or a JSON object.

In another embodiment, in addition to authenticating the device, RoT identity server 114 can provide unique identities to the devices that are valid only within the context of a particular IoT application. This may be useful when the devices need to be tracked, while preserving privacy of the device/user by not allowing the device to use the same ID across multiple services. Additionally, the protocol must not leak immutable IDs. These IDs are typically provided in the "sub" field of the ID Token, returned by the RoT authentication service 104. Instead, in another embodiment, in the privacy preserving configuration, an alias representing the device in this particular application is used in the "sub" field of the ID Token.

While FIGS. 5-6 illustrate and describe the interactions between the components from the logical or security point of view, these messages can be exchanged using HTTP or similar mechanisms. The diagram below maps the exchanges above to the HTTP methods. These describe only what happens from the device perspective and does not include exchanges that do not involve the device. Also, the mechanism of the exchanges between provisioning policy server 116 and the authentication policy server 112 may be various types of mechanisms, including exchanging pre-shared keys prior to deployment.

Figure 7:
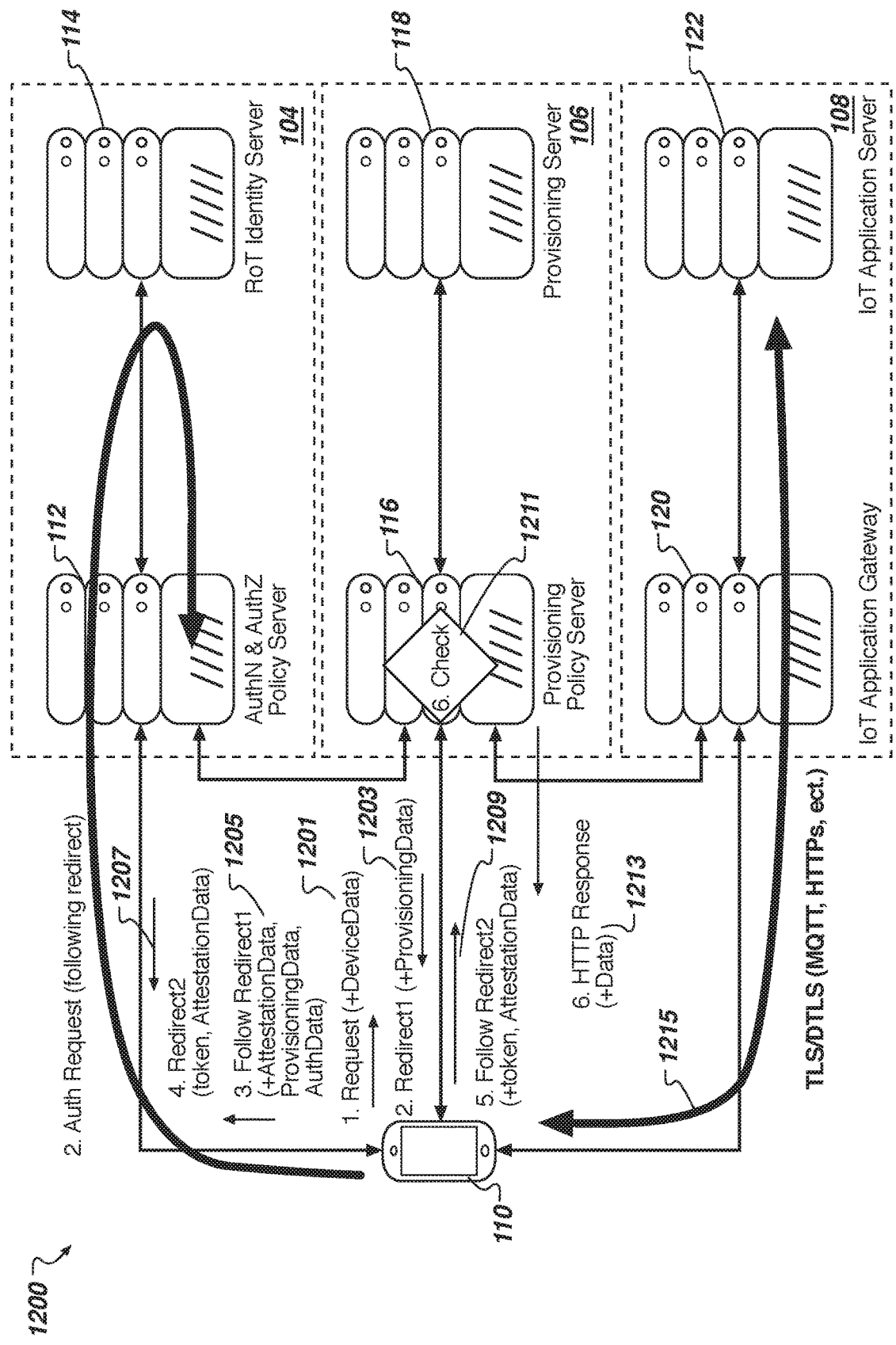
FIG. 7 is a flow diagram illustrating a sequence of HTTP messages exchanged between the IoT device, the RoT authentication service, the device provisioning service, and the IoT application service according to one embodiment.

FIG. 7 is a flow diagram illustrating a sequence 1200 of HTTP messages exchanged between the IoT device 110, the RoT authentication service 104, the device provisioning service 106, and the IoT application service 108 according to one embodiment. For the sequence 1200, the IoT device 110 initially sends a request 1201 to the provisioning policy server 116. The request 1201 may include device data. The provisioning policy server 116 sends a first redirect 1203 (Redirect1) back to the IoT device 110. The first redirect 1203 includes the provisioning data. The provisioning data may be values generated by the provisioning policy server 116 to assist in the provisioning transaction, such as a nonce, timestamp, HMAC(nonce|time). Following the first redirect 1203, the IoT device 110 sends an authentication request 1205 (Follow Redirect1) to the authentication policy server 112. The authentication request 1205 includes the provisioning data, as well as attestation data, and authorization data. The attestation data may be values transferred to a cryptographic core (e.g., CM core) of the IoT device 110 by the application, which needs to be signed (MAC'ed) by the cryptographic core. The attestation data may be signed by a public key or a certificate signing request (CSR). The authentication data may be a signature or a checksum, allowing the authentication services 104 to authenticate the requesting device and validate incoming data. The authentication policy server 112 sends a second redirect 1207 (Redirect2) back to the IoT device 110. The second redirect 1207 includes a token and attestation data. Following the second redirect 1207, the IoT device 110 sends a request 1209 (Follow Redirect2) to the provisioning policy server 116. The request 1209 includes the token and the attestation data. The provisioning policy server 116 checks the token and the attestation data. The provisioning policy server 116 sends a HTTP response 1213, including provisioned data (e.g., device's application certificate and other application related data), back to the IoT device 110. Once authenticated and authorized by the device provisioning service 106 and the RoT authentication service 104, the IoT device can communicate with the IoT application services 108, such as using a secure connection over TLS/DTLS (MQTT, HTTPs, or the like).

The following examples are HTTP transactions described above with respect to FIG. 7.

1. Request 1201:

```
POST /provisionMe?response_type=code&scope=authn
   HTTP/1.1
Host: provisioner.iotProvider.com
Accept: application/json
{"DeviceData":"AAEC...AwQFBgc="}
```

2. Redirect1 1203:

```
HTTP/1.0 302 Found
Location: https://oidcserver.com/provisionMe/
{"AuthChain":"AQFA...EAwCBcg=",
"nonce":"BCXF..BCEwUxn=",
"reqTime":1311280969,
"hmac":"AFBC..AAEwQnb="}
```

3. Follow redirect1 1205:

```
POST /provisionMe?response_type=code&scope=authn HTTP/1.1
Host: oidcserver.com
Accept: application/json
{"AttestationData":"AAAw...ECQFBcg=",
"AuthData":"AAEC...AwQFBgc=",
"nonce":"BCXF..BCEwUxn=",
"reqTime":1311280969,
"hmac":"AFBC..AAEwQnb="}
```

4. Redirect2 1207:

---
HTTP/1.0 302 Found
Location: https://provisioner.iotProvider.com/provisionMe/token/<tokenID>
<Token> (examples below)

---

5. Follow redirect2 1209:

---
POST /provisionMe/token/<tokenID> HTTP/1.1
Host: provisioner.iotProvider.com
Accept: application/json
{"AttestationData":"AAAw...ECQFBcg="}

---

6. HTTP Response 1213:

---
HTTP/1.0 200 OK
Content-Type: application/json
Content-Length: xxxx
{"Data":"AwQF...AAECBgc="}

---

As described above, the second redirect 1207 includes one or more tokens. The token may be an identity token or the tokens may be an identity token and an access token. There are several alternatives with respect to the output of the Module and how the resulting data is converted into an identity token (idToken) and optionally access token. First, the output depends on the use case. Below are two example outputs in two use cases. The first example is where only authentication of the device is required. The second example is where attestation data is included. The cryptographic core can provide a certificate-signing request as attestation data. It should be noted that the output depends on the success or failure of authentication. In the case where successful authentication has been completed by the RoT identity server 114, the identity token is issued, such as in a format shown below in Example 1. In the case of failure to authenticate, an error message can be sent back. Alternatively, in another approach, an error message is not provided back to the device, or to any device outside of the RoT identity server 114. Sending the error message back may help with system load, but not sending the error message back may help with security, where an attacker cannot easily learn about failed authentication attempts.

Example 1

Authentication-only Use Case: Module response (returned by Module and sent from RoT identity server 114 to authentication policy server 112) that may be included in the second redirect 1207.

---
{"Identity Token":
  {
    "sub": "alias1234", /* alias chosen based on device's rotID */
    "auth_time": 1311280969, /* time of authentication */
    "nonce":"AWFQ...Gwcg=", /* copied from the request */
    "req_time": 1311280802, /* copied from the request */
    "hmac":"AABc...CQEfcg=" /* copied from the request */
  }
}

---

Token contents (created by AuthN & AuthZ Policy Server):

---
{"IdentityToken":
  {
    "iss": "https://authn.abc.com", /* issuer - static value for a given server */
    "sub": "alias1 234", /* alias - given by the module */
    "aud": "iotProvider1", /* audience - static value for the solution */
    "exp": 1311281970, /* computed based on the policy and time of
authn (iat) below*/
    "iat": 1311280970, /* time of issue of the token */
    "auth_time": 1311280969, /* time of authentication - given by the module */
    "amr": "uin:abc:cmv1", /* authentication method references - static value based
on authn method */
    "nonce":"AWFQ...Gwcg=", /* copied from the request */
    "req_time": 1311280802, /* copied from the request */
    "hmac":"AABc....CQEfcg=" /* copied from the request */
  }
}

---

Token:
Header:

---
{"alg":"ES256","enc":"none"}.
{token (with claims from above)}.
signature
eyJ0eXAiOiJKV1QiLA0KICJhbGciOiJIUzI1NiJ9
.
eyJpc3MiOiJqb2UiLA0KICJ1eHAiOjEzMDA4MTkzODAsDQogImh0dHA6Ly9leGFt
cGxlLmNvbVS9pc19yb290Ijp0cnVlfQ
.
dBjftJeZ4CVP-mB92K27uhbUJU1p1r_wW1gFWFOEjXk

---

The above token is an example of a format of the encoded token, but doesn't contain realistic data.

Example 2

Authentication and Attestation Data Use Case: Module response (returned by Module and sent from RoT identity server 114 to authentication policy server 112) that may be included in the second redirect 1207.

```
{"IdentityToken":
    {
      "sub": "alias1234", /* alias chosen based on device's rotID */
      "auth_time": 1311280969, /* time of authentication */
      "nonce":"AWFQ...Gwcg=", /* copied from the request */
      "req_time": 1311280802, /* copied from the request */
      "hmac":"AABc...CQEfcg=" /* copied from the request */
    },
"AccessToken":
    {
      "attesetationData": "AQEc....CfABcg=",  /* base64-encoded
      attestation data, i.e.
CSR */
    }
}
```

Token contents (created by AuthN & AuthZ Policy Server):

```
{"IdentityToken":
    {
      "iss": "https://authn.abc.com", /* issuer - static value for a given server */
      "sub": "alias1234",    /* alias - given by the module */
      "aud": "iotProvider1", /* audience - static value for the solution */
      "exp": 1311281970, /* computed based on the policy and time of
authn (iat) below*/
      "iat": 1311280970, /* time of issue of the token */
      "auth_time": 1311280969, /* time of authentication - given by the module */
      "amr": "urn:abc:cmv1", /* authentication method references - static value based
on authn method */
      "nonce":"AWFQ...Gwcg=", /* copied from the request */
      "req_time": 1311280802, /* copied from the request */
      "hmac":"AABc....CQEfcg==" /* copied from the request */
    },
"AccessToken":
    {
      "attesetationData": "AQEc....CfABcg=",  /* base64-encoded attestation data, i.e.
CSR */
    }
}
```

Token:
Header:

```
{"alg":"ES256","enc":"none"}.
{token (with claims from above)}.
signature
eyJ0eXAiOiJKV1QiLA0KICJhbGciOiJTUz I1NiJ9
.
eyJpc3MiOiJqb2UiLA0KICJleHAiOjEzMDA4MTkzODAsDQogImh0dHA6Ly95leGFt
cGxlLmNvbS9pc29yb290IjpOcnVlfQ
.
dBjftJeZ4CVP-mB92K27uhbUJUlplr_wWlgFWFOEjXk
```

The above token is an example of a format of the encoded token, but doesn't contain realistic data.

While authentication and identity services are useful, in other embodiments, the infrastructure can also provide data attestation functionality. Using this functionality, an application can have its public key (or a certificate signing request) signed by the cryptographic core and validated at the backend, which, in turn, can be validated by the provisioning policy server 116. This validation can be used as a policy for issuing certificates to the applications running on the device. It should be noted that, although the cryptographic core may be blind-signing the data it is given, the signing of this data may still be useful to provide a layer of validation for issuance of certificates, as shown in the flow and sequence details of FIG. 8.

Figure 8:
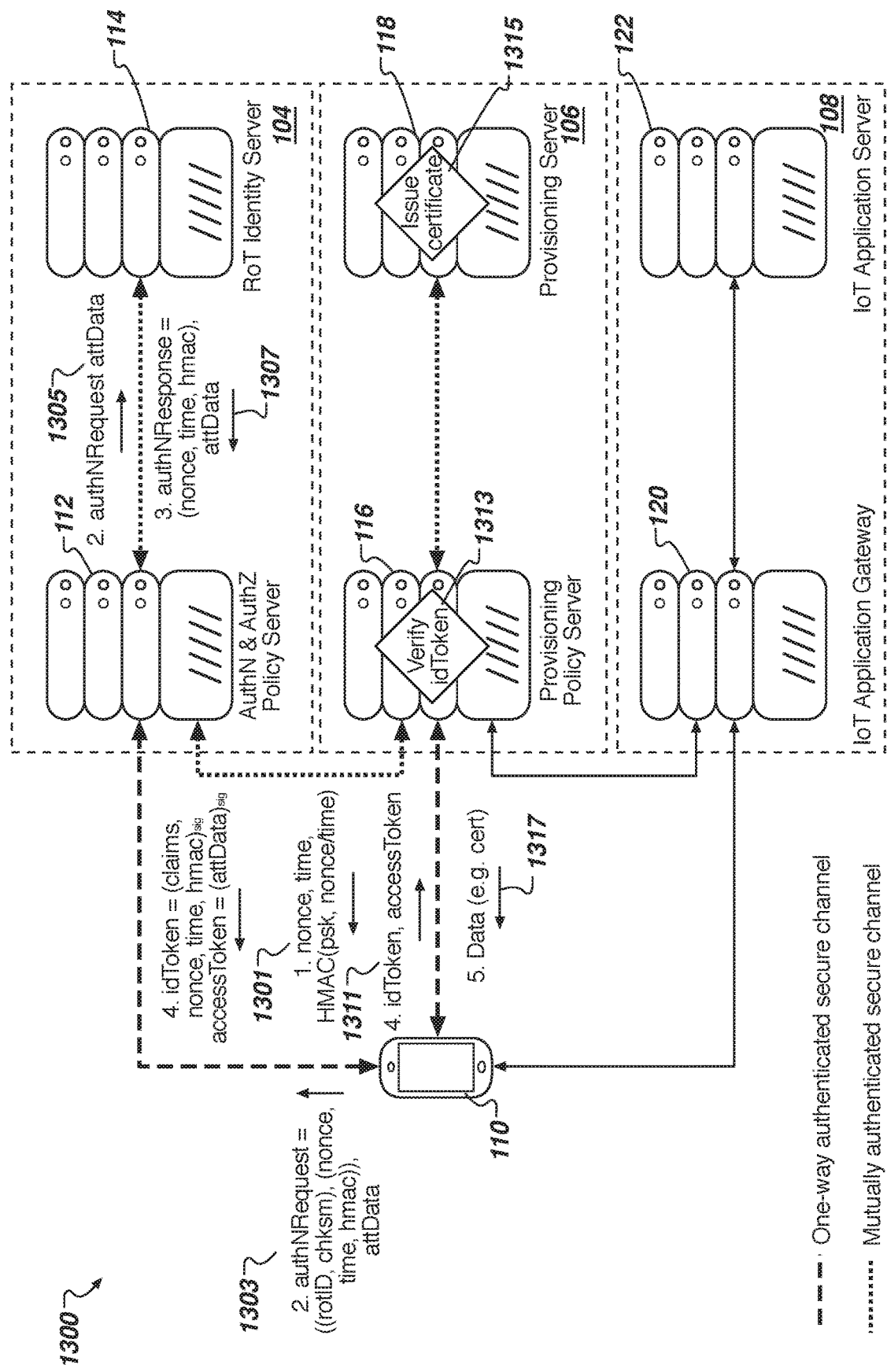
FIG. 8 is a flow diagram illustrating a sequence of interactions between an IoT device, the RoT authentication service, the device provisioning service, and the IoT application service for authentication, identity, and data attestation according to one embodiment.

FIG. 8 is a flow diagram illustrating a sequence 1300 of interactions between an IoT device 110, the RoT authentication service 104, the device provisioning service 106, and the IoT application service 108 for authentication, identity, and data attestation services according to one embodiment. The sequence 1300 may start with the provisioning policy server 116 sending a redirect response 1301 to the IoT device 110 in response to an initial request from the IoT device 110 (not illustrated). The redirect response 1301 may include a nonce, a timestamp (or other time information, and HMAC(PSK, nonce|time). As described above, the PSK can be pre-shared key between the provisioning policy server 116 and the authentication policy server 112. The nonce may be a random value selected by the provisioning policy server 116.

In response to the redirect response 1301, the IoT device 110 generates an authentication request 1303 to send to the authentication policy server 112. The authentication request 1303 may include a rotID, a checksum, the nonce, the time stamp, the HMAC, and attestation data (labeled attData). The checksum (chksum) may be computed over a derived PADAK, rotID and device data (Pub). PADAK is a base (or root) key from which other keys can be derived. The PADAK may be programmed during silicon manufacturing, but before the end customer (e.g. OEM) is known. Since these devices can be distributed to many different OEMs, a new key is derived based on the PADAK that is unique to the device and the OEM. The checksum can be used to authenticate the device and validate device data (Pub). Pub is a reference to the public key, which typically is a part of the attestation data or device data, which is the basis of the certificate-signing request. The attestation data is additional data provided by the application to the cryptographic core (e.g., CM core). The cryptographic core encrypts and signs this data before it is sent to the authentication policy server 112. This attestation data is validated and then packaged as part of the access token. An example of such data is the application's public key, which can be used as a basis for certificate issuance by the provisioning server 118. In one implementation, the data that is attested by the IoT device 110 is its public key that is used for secure transactions with the IoT application. The public key that is attested by the IoT device 110 is used to create a certificate. That certificate is used during the mutually authenticated Transport Layer Security (TLS) session with the IoT application. The data 1317 (e.g. cert) contains this public key. Using the TLS public key in the RoT chksum calculation provides proof that this IoT device 110 and only this device has this public key and its related private key.

The authentication policy server 112 receives the authentication request 1303 with the attestation data and sends the authentication request 1303 along to the RoT identity server 114 as authentication request 1305. The authentication request 1305 also includes the attestation data. The RoT identity server 114 responds with an authentication response 1307, the authentication response 1307 including the nonce, the timestamp, the HMAC, and the attestation data. The authentication policy server 112 receives the authentication response 1307. Assuming the authentication response 1307 validates the authentication request 1305, the authentication policy server 112 provides an identity token (idToken) and an access token (accessToken) 1309 to the IoT device 110. As noted above, the access token may be the signed attestation data. The idToken may include the nonce, the timestamp, and the HMAC. The nonce, timestamp, and HMAC may be digitally signed. The IoT device 110 submits the identity token and access token 1309 to the provisioning policy server 116 as the identity token and access token 1311.

The provisioning policy server 116 verifies the identity token 1011 at block 1313. To verify the identity token, the provisioning policy server 116 can communicate with the provisioning server 118 over a mutually authenticated secure channel 1015. At block 1315, the provisioning server 118 determines whether to issue a certificate. When the provisioning server 118 issues the certificate, the provisioning policy server 116 sends data 1317, including the certificate, back to the IoT device 110. Similarly, the authentication policy server 112 and the RoT identity server 114 can communicate over a mutually authenticated secure channel. The IoT device 110 and the authentication policy server 112 communicate over a one-way authenticated secure channel and the IoT device and the provisioning policy server 116 communicate over a one-way authenticated secure channel.

In some embodiments, at a high level from this limited security perspective, interactions are initiated by an application when it attempts to contact the provisioning service 106 (e.g., 1301), for which it needs an authentication request (1303). Provisioning policy server 116 responds with a redirect to the authentication policy server 112, the redirect including the additional data illustrated in FIG. 8, such as the nonce, time, and HMAC. Subsequently, the IoT device 110 produces the request with the help of the CM Core, using the Static Sequence. After the Sequence has been executed, the output, containing the rotID (an identifier of CM Core) and a checksum, are produced by CM Core, in addition to the data received from the provisioning policy server 116 (nonce, time, and HMAC) and forwarded by the application to the OIDC server (e.g., 112). The output also includes the attestation data. These data items are further forwarded by the authentication policy server 112 to RoT identity server 114, where the HSM Module is executed. Prior to its execution, time and HMAC are verified. Then, rotID is used to lookup derived rotKey (key shared between the core and the infrastructure, corresponding to the device with a given rotID). This value of derived rotKey is used by the Module to verify the checksum. Once that is done, RoT identity server 114 returns to the authentication policy server 112 an authentication response 1307 and the authentication policy server 112 returns two tokens describing the authentication parameters. One token may be the identity token, as specified by OpenID Connect protocol, which includes among other things the identity of the device (its alias). This token is formatted as JSON with token (jwt) and can be signed by the asymmetric key of the authentication policy server 112 (AuthN&AuthZ Policy Server) to be verified by the provisioning policy server 116. The other token may be the access token, which includes signed attestation data that can be validated by the device provisioning service 106. An example of this data may be the application's public key, which can be used as a basis for certificate issuance by the provisioning server 118 at block 1315.

Various embodiments described above assume that the root of trust on the device is the CM core that uses symmetric keys. However, various IoT devices (also referred to as IoT endpoints) in the infrastructure need to be supported by the IDM. Described below are two alternatives that rely on a cryptographic core using asymmetric keys not only for input validation, as described above in the CM core embodiments, but also as the cryptographic core's credentials, including pubDB-based provisioning and PKI-based provisioning. In PKI-based provisioning, the result of personalization is a core certificate. This alternative is similar to the symmetric core embodiments in that the core becomes a part of the provisioning public key infrastructure (PKI). In another alternative, pubDB-based provisioning, the devices have asymmetric key pairs, but they do not have certificates. Instead, the backend has a database of devices' public keys, indexed by their IDs (rotIDs). This can be viewed as a hybrid between symmetric-key-based provisioning, where there is a key lookup database, and the PKI-based provisioning, where there are asymmetric keys as cores' credentials.

Figure 9:
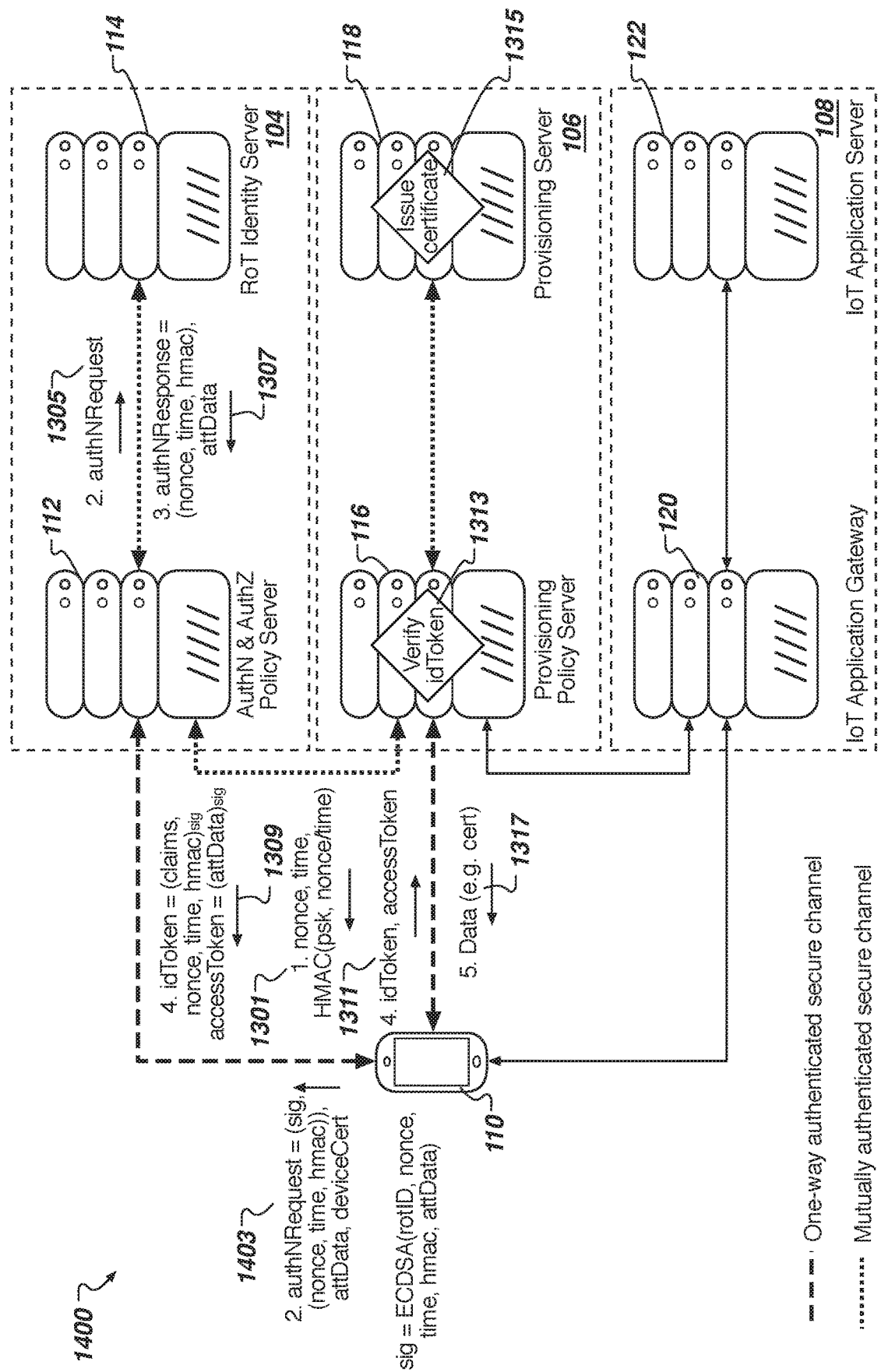
FIG. 9 is a flow diagram of a pubDB-based provisioning process according to one embodiment.

FIG. 9 is a flow diagram of a pubDB-based provisioning process according to one embodiment. For ease of description, the process 1400 uses the same sequence 1300 of interactions of FIG. 8 as noted by similar reference numbers. This embodiment uses the attestation data as it is a useful provisioning case. In response to the redirect response 1301, the IoT device 110 generates and sends an authentication request 1403 to send to the authentication policy server 112. The authentication request 1403 includes a rotID, a signature, the nonce, the time stamp, the HMAC, and attestation data (labeled attData). The signature may be an ECDSA signature and may be computed using the device's private key over rotID, time, and device data (Pub). The signature is used to authenticate the device and validate device data (Pub) as described in more detail above. As in the sequence 1300, the attestation data is additional data provided by the application to the asymmetric cryptographic core. The cryptographic core encrypts and signs this data before it is sent to the authentication policy server 112. This attestation data is validated and then packaged as part of the access token.

An example of such data is the application's public key, which can be used as a basis for certificate issuance by the provisioning server 118.

The authentication policy server 112 receives the authentication request 1403 with the attestation data and the device certificate and sends the authentication request 1403 with the attestation data along to the RoT identity server 114 as authentication request 1305. The RoT identity server 114 responds with an authentication response 1307, the authentication response 1307 including the nonce, the timestamp, the HMAC, and the attestation data. The authentication policy server 112 receives the authentication response 1307. Assuming the authentication response 1307 validates the authentication request 1305, the authentication policy server 112 provides an identity token (idToken) and an access token (accessToken) 1309 to the IoT device 110. As noted above, the access token may be the signed attestation data. The idToken may include the nonce, the timestamp, and the HMAC. The nonce, timestamp, and HMAC may be digitally signed. The IoT device 110 submits the identity token and access token 1309 to the provisioning policy server 116 as the identity token and access token 1311.

It should be noted that the main difference between the embodiments of FIG. 9 and the embodiments of FIG. 8 is the type of the signature computed by the asymmetric core. Here it is assumed to be ECDSA, whereas, in symmetric core case, the signature is the proprietary checksum computed by the symmetric core (e.g., CM core).

Figure 10:
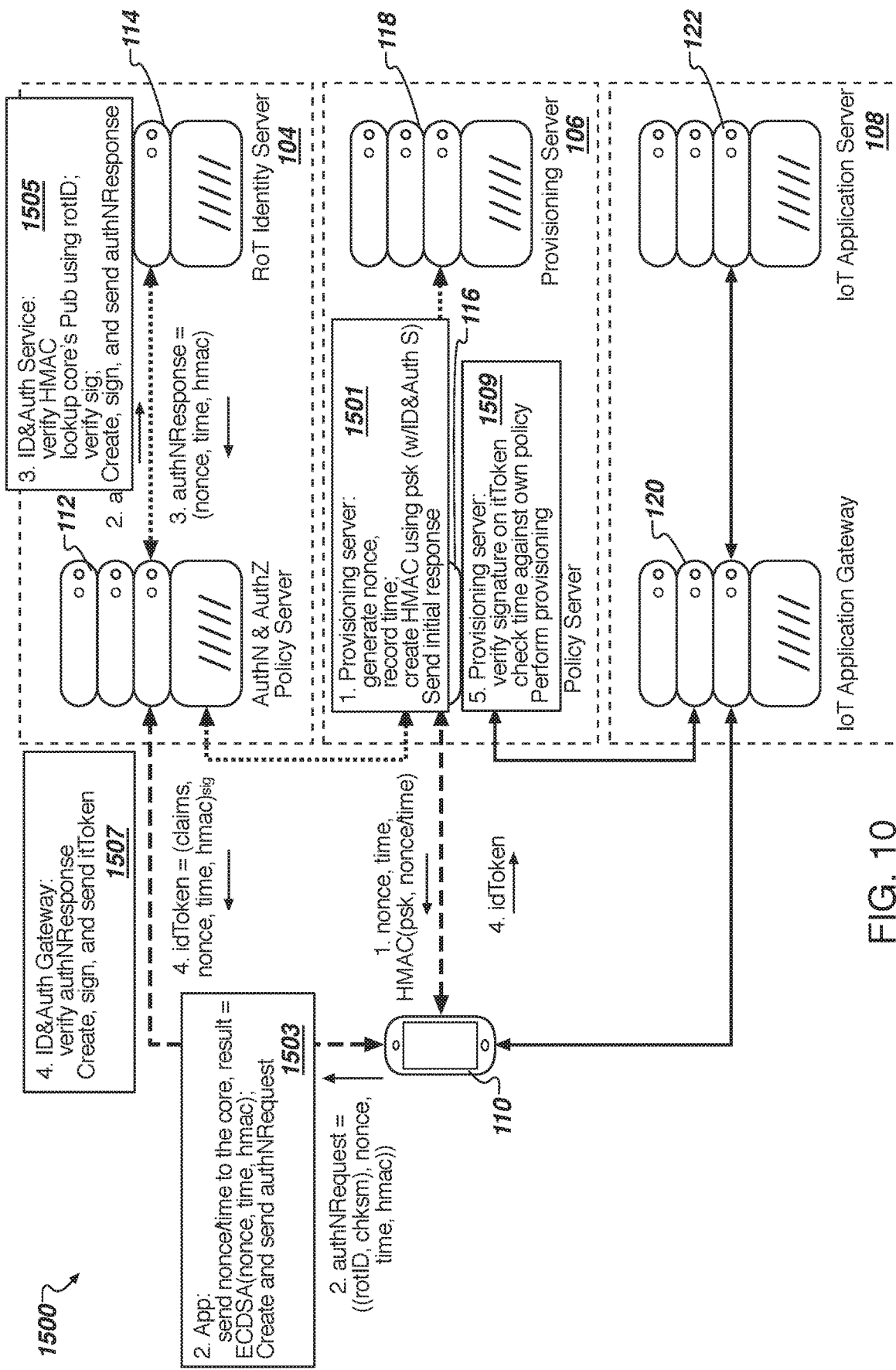
FIG. 10 is a flow diagram illustrating various operations performed on each of the relevant components for the sequence of FIG. 14 according to one embodiment.

FIG. 10 is a flow diagram illustrating various operations performed on each of the relevant components for the sequence of FIG. 9 according to one embodiment. The provisioning policy server 116 at block 1501, generates the nonce, records the timestamp and creates HMAC using PSK, and sends the initial response (redirect response). The application at the IoT device 110 at a block 1503 sends the nonce and timestamp to a buffer of the asymmetric core and the asymmetric core executes a sequence to obtain a signature result. For example, the signature result is an ECDSA signature that is computed using the nonce, timestamp, and HMAC. The application, at the block 1503, also creates and sends the authentication request to the RoT identity server 114 via the authentication policy server 112. At block 1505, the RoT identity server 114 verifies the HMAC, looks up the cores' public key in a database of devices' public keys, indexed by their IDs (rotIDs). The RoT identity server 114 also verifies the signature of the authentication request. The RoT identity server 114 also creates, signs, and sends the authentication response back to the authentication policy server 112. At block 1507, the authentication policy server 112 verifies the authentication request. Upon verification, the authentication policy server 112 creates, signs, and sends the identity token (and optional access token) to the application at the IoT device 110. The application at the IoT device 110 sends the identity token back to the provisioning policy server 116, which at block 1509, verifies the signature on the identity token and checks the time against its own policy. The provisioning policy server 116 also performs the provisioning operations.

It should be noted that since in the above flow no state is held by any of the entities and is completely encapsulated in the request or response objects, there is no need to have an explicit identifier for a session identifier (session id). It should also be noted that the request/response objects themselves may be represented by a URL-encoded string or a JSON object.

In another embodiment, in addition to authenticating the device, RoT identity server 114 can provide unique identities to the devices that are valid only within the context of a particular IoT application. This is useful when the devices need to be tracked, while preserving privacy of the device/user by not allowing the device to use the same ID across multiple services. Additionally, the protocol must not leak immutable IDs. These IDs are typically provided in the "sub" field of the ID Token, returned by the RoT authentication service 104. Instead, in another embodiment, in the privacy preserving configuration, an alias representing the device in this particular application is used in the "sub" field of the ID Token. In the pubDB-based provisioning, an alias is associated with the application and its credentials, while immutable ID is used by the backend to lookup the public key.

Figure 11:
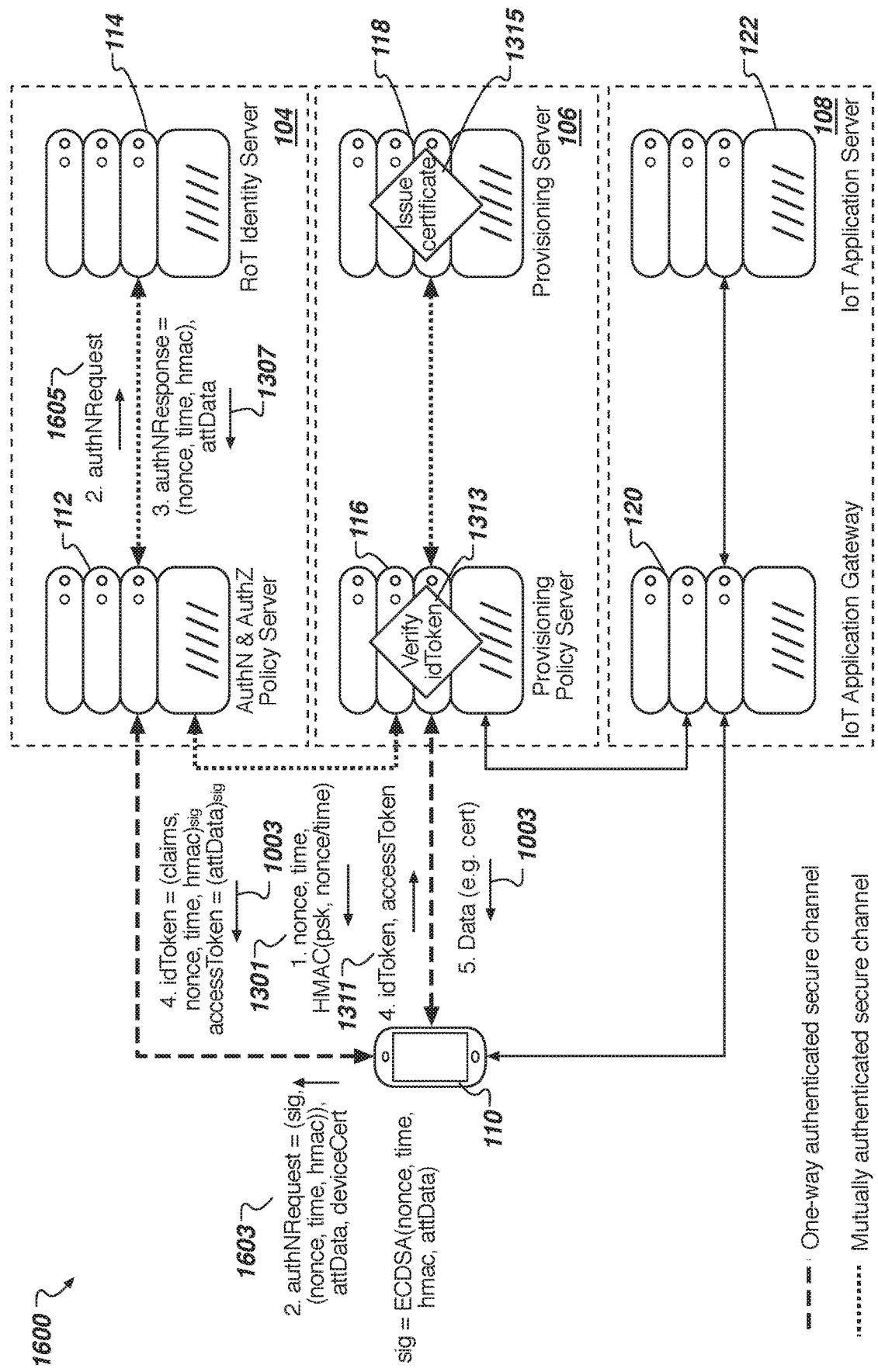
FIG. 11 is a flow diagram of a signature PKI-based provisioning process according to one embodiment.
Figure 12:
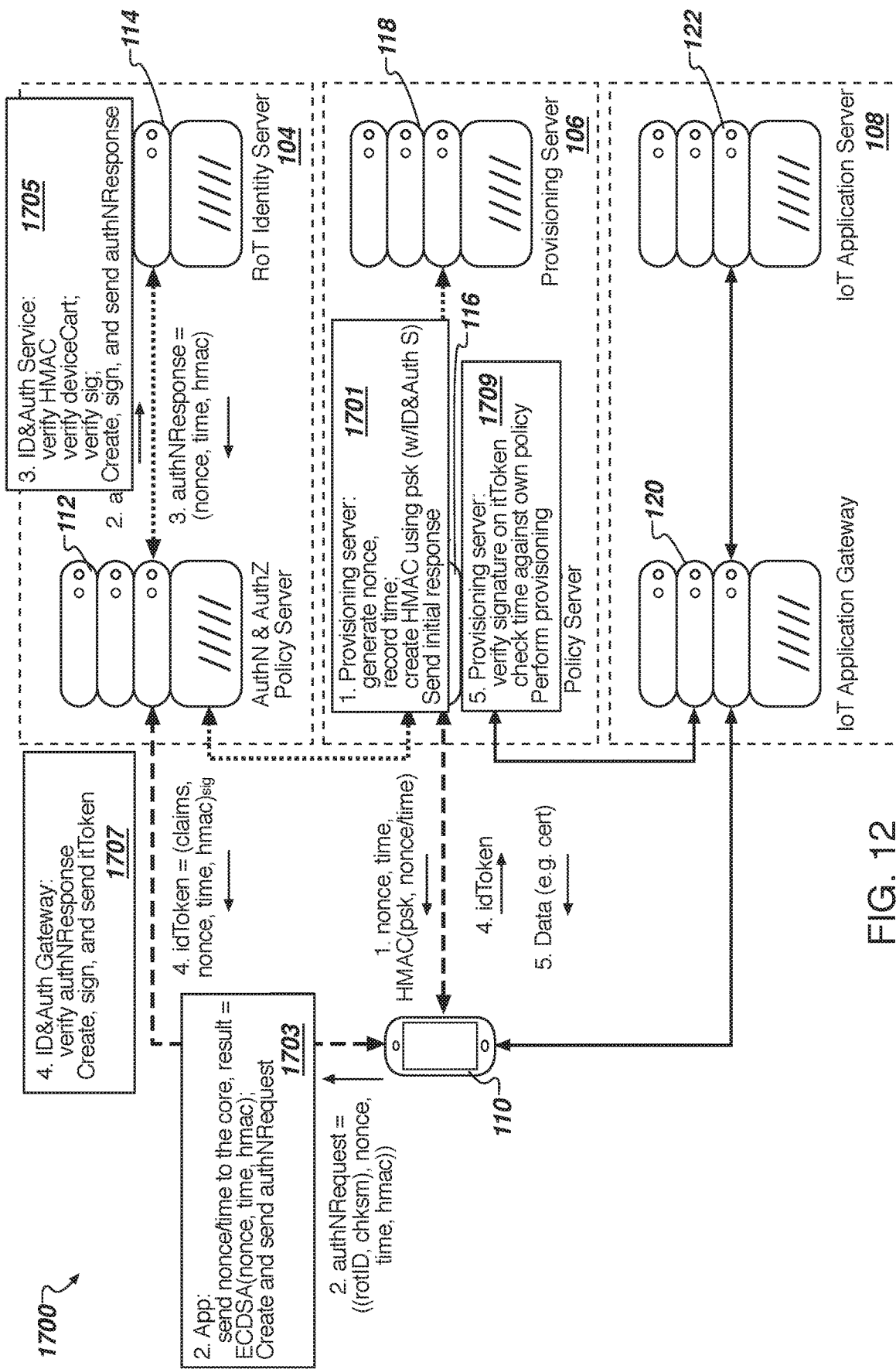
FIG. 12 is a flow diagram illustrating various operations performed on each of the relevant components for the sequence of FIG. 16 according to one embodiment.
Figure 13:
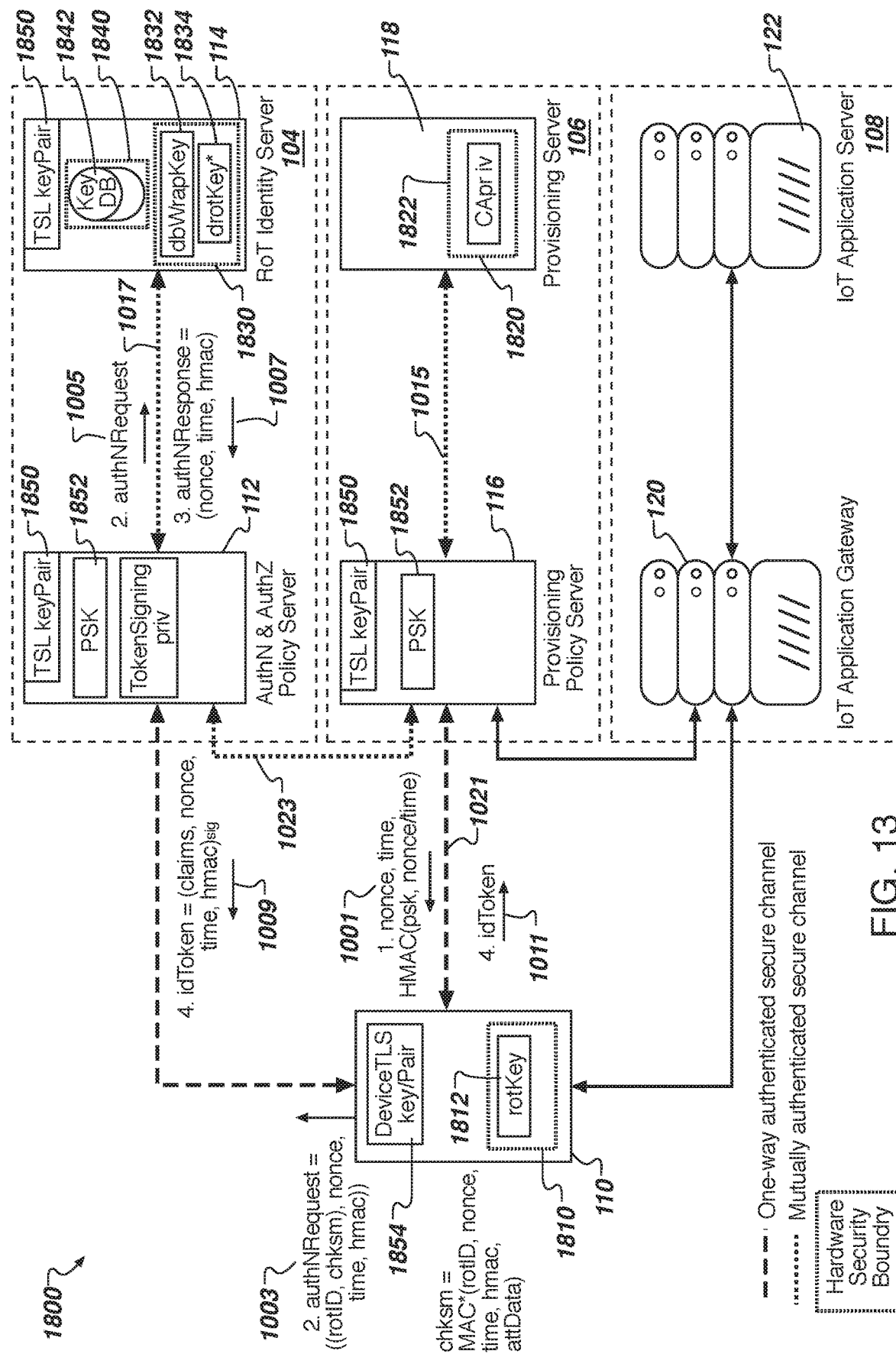
FIG. 13 is a flow diagram of a TLS PKI-based provisioning process 1900 for a symmetric core according to one embodiment.
Figure 14:
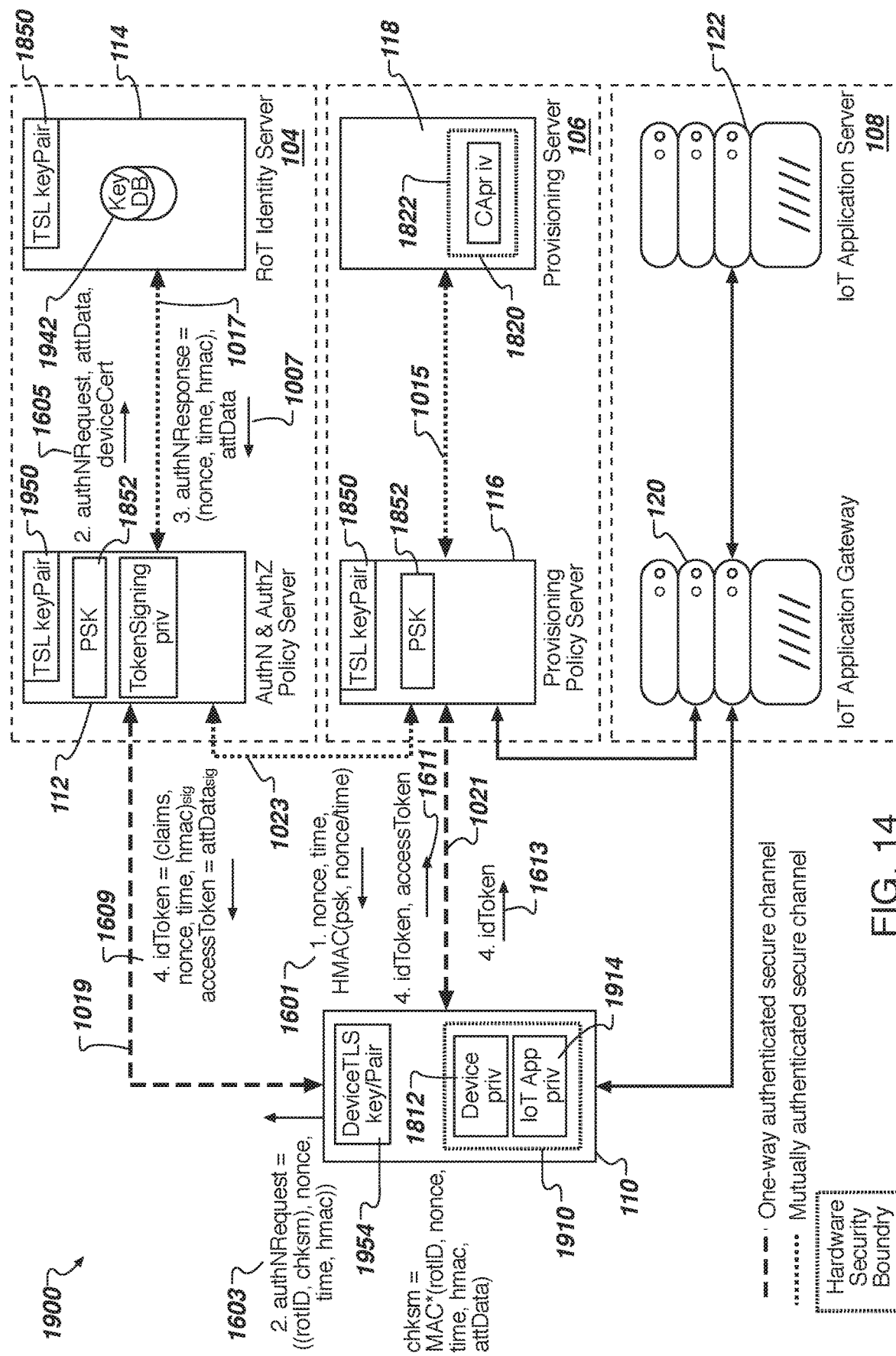
FIG. 14 is a flow diagram of a TLS PKI-based provisioning process 1900 for an asymmetric core according to one embodiment.

Described below there are two sub-cases for PKI-based provisioning. One sub-case uses a similar flow and processing as the pubDB-based flow and processing illustrated and described above with respect to FIGS. 9-10. That is, the asymmetric core is doing the signing of the nonce, time, HMAC, and attestation data using ECDSA and the IoT device 110 sends the result to the authentication policy server 112. This sub-case is referred to as the signature PKI-based provisioning process, as illustrated in FIGS. 11-12. Another sub-case is to use TLS connection terminated in the core and not rely on the TLS provided by the host device. This may be a better alternative from a security perspective, but may be a more complex design, since now the operating system (e.g., a high-level operating system (HLOS)) of the device needs to act as a proxy, rather than a TLS endpoint, as in all other cases. This sub-case is referred to as TLS PKI-based provisioning, as illustrated in FIGS. 13-14.

FIG. 11 is a flow diagram of a signature PKI-based provisioning process 1600 according to one embodiment. For ease of description, the process 1600 uses the same sequence 1400 of interactions of FIG. 9, including attestation data, as noted by similar reference numbers. In response to the redirect response 1301, the IoT device 110 generates and sends an authentication request 1603 to send to the authentication policy server 112. The authentication request 1603 includes a signature of the nonce, the time stamp, the HMAC, attestation data (labeled attData), and a device certificate (deviceCert). The signature may be an ECDSA signature and may be computed using the nonce, time, HMAC, and attestation data. The signature is used to authenticate the device and validate device data (Pub). As in the sequence 1400, the attestation data is additional data provided by the application to the asymmetric cryptographic core. The cryptographic core encrypts and signs this data before it is sent to the authentication policy server 112. This attestation data is validated and then packaged as part of the access token. An example of such data is the application's public key, which can be used as a basis for certificate issuance by the provisioning server 118.

The authentication policy server 112 receives the authentication request 1603 with the attestation data and the device certificate and sends the authentication request 1603 with the attestation data and device certificate along to the RoT identity server 114 as authentication request 1605. The RoT identity server 114 responds with an authentication response 1307, the authentication response 1307 including the nonce, the timestamp, the HMAC, and the attestation data. The RoT identity server 114 can verify that the device certificate is signed by a trusted authority, and then it can extract the public key from the trusted device certificate. The public key from the device certificate can then be used to verify the authentication response (digital signature). In general, RoT identity server 114 can use certificates (as well as symmetric keys or database of public keys) to authenticate devices. For example, there could be "manufacturing certificates" and "application certificates". The latter could be issued based on authentication provided by the former. The authentication policy server 112 receives the authentication response 1307. Assuming the authentication response 1307 validates the authentication request 1305, the authentication policy server 112 provides an identity token (idToken) and an access token (accessToken) 1309 to the IoT device 110. As noted above, the access token may be the signed attestation data. The idToken may include the nonce, the timestamp, and the HMAC. The nonce, timestamp, and HMAC may be digitally signed. The IoT device 110 submits the identity token and access token 1309 to the provisioning policy server 116 as the identity token and access token 1311.

It should be noted that the main difference between the embodiments of FIG. 11 and the embodiments of FIG. 9 is the signature computed by the asymmetric core and the device certificate that are sent in the authentication request 1603.

FIG. 12 is a flow diagram illustrating various operations performed on each of the relevant components for the sequence of FIG. 11 according to one embodiment. The provisioning policy server 116 at block 1701, generates the nonce, records the timestamp and creates HMAC using PSK, and sends the initial response (redirect response). The application at the IoT device 110 at block 1703 sends the nonce and timestamp to a buffer of the asymmetric core and the asymmetric core executes a sequence to obtain a signature result. For example, the signature result is an ECDSA signature that is computed using the nonce, timestamp, and HMAC. The application, at the block 1703, also creates and sends the authentication request to the RoT identity server 114 via the authentication policy server 112. The authentication request, as described above, includes the device certificate. At block 1705, the RoT identity server 114 verifies the HMAC, verifies the device certificate, and verifies the signature of the authentication request. The RoT identity server 114 also creates, signs, and sends the authentication response back to the authentication policy server 112. At block 1707, the authentication policy server 112 verifies the authentication request. Upon verification, the authentication policy server 112 creates, signs, and sends the identity token (and optional access token) to the application at the IoT device 110. The application at the IoT device 110 sends the identity token back to the provisioning policy server 116, which at block 1709, verifies the signature on the identity token and checks the time against its own policy. The provisioning policy server 116 also performs the provisioning operations.

It should be noted that since in the above flow no state is held by any of the entities and is completely encapsulated in the request or response objects, there is no need to have an explicit identifier for a session identifier (session id). It should also be noted that the request/response objects themselves may be represented by a URL-encoded string or a JSON object.

As described above, in the TLS PKI-based provisioning, the core acts as a TLS client and uses its device private key and certificate for client authentication within the TLS session. Once that session is established, any application-layer protocol can be run on top of it, including provisioning another certificate, such as described in the security perimeters and keys used in FIG. 13.

FIG. 13 is a flow diagram of a TLS PKI-based provisioning process 1800 for a symmetric core according to one embodiment. In the process 1800, some of the devices have hardware security boundaries, including: a hardware security boundary 1810 of the IoT device 110 in which the root key (rotKey) 1812 is stored; a hardware security boundary 1820 of the provisioning server 118 in which a certificate authority private key (CApriv) 1822 is stored; and a hardware security boundary 1830 of the RoT identity server 114 in which a database wrapped key (dbWrapKey) 1832 and a derived root key (drotkey) 1834 are stored. The dbWrapKey is the key that is used to encrypt a database of device keys. For example, if the backend uses a database of symmetric keys and associated device IDs, it needs to be encrypted at rest. For this, the dbWrapKey is used. The RoT identity server 114, in some embodiments, includes a hardware security boundary 1840 in which a key database 1842 is stored.

For ease of description, the process 1800 uses the same sequence 1000 of interactions of FIG. 5 as noted by similar reference numbers. However, the sequence of the process 1800 uses TLS as described below. For example, the provisioning policy server 116 and the authentication policy server 112 can communicate over the mutually authenticated secure channel 1023 using TLS key pairs 1850. The provisioning policy server 116 and the authentication policy server 112 can exchange pre-shared keys (PSKs) 1852. Similarly, the authentication policy server 112 and the RoT identity server 114 can communicate over the mutually authenticated secure channel 1017 using TLS key pairs 1850. The IoT device 110 can use a device TLS key pair 1854 to communicate over the one-way authenticated secure channel 1019 with the authentication policy server 112, over the one-way authenticated secure channel 1021 with the provisioning policy server 116, or both.

FIG. 14 is a flow diagram of a TLS PKI-based provisioning process 1900 for an asymmetric core according to one embodiment. In the process 1900, some of the devices have hardware security boundaries, including: a hardware security boundary 1910 of the IoT device 110 in which a device private key 1912 and a IoT application private key 1914 are stored; and a hardware security boundary 1920 of the provisioning server 118 in which a certificate authority private key (CApriv) 1922 is stored. It should be noted that the RoT identity server 114 can store a public key database 1942 that does not need to be stored within a hardware security boundary.

For ease of description, the process 1900 uses the same sequence 1600 of interactions of FIG. 11 as noted by similar reference numbers. However, the sequence of the process 1900 uses TLS as described below. For example, the provisioning policy server 116 and the authentication policy server 112 can communicate over the mutually authenticated secure channel 1023 using TLS key pairs 1950. The provisioning policy server 116 and the authentication policy server 112 can exchange pre-shared keys (PSKs) 1952. Similarly, the authentication policy server 112 and the RoT identity server 114 can communicate over the mutually authenticated secure channel 1017 using TLS key pairs 1950. The IoT device 110 can use a device TLS key pair 1954 to communicate over the one-way authenticated secure channel 1019 with the authentication policy server 112, over the one-way authenticated secure channel 1021 with the provisioning policy server 116, or both.

In addition to authentication, identity, and attestation services described above, additional security checks can be performed by the system, if so required. One example of an additional security check is illustrated in FIG. 15.

Figure 15:
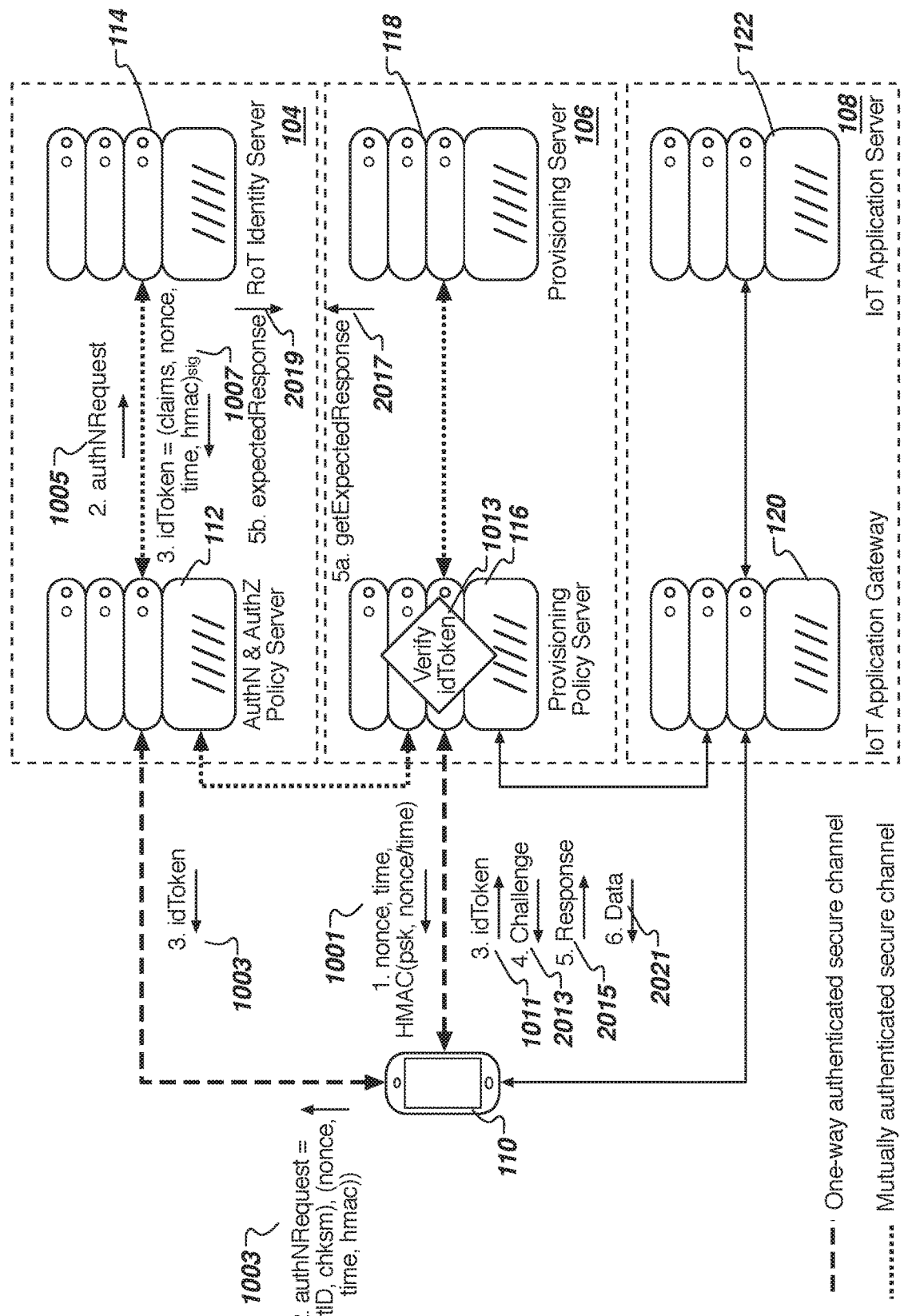
FIG. 15 is a flow diagram of a live security check process according to one embodiment.

FIG. 15 is a flow diagram of a live security check process 2000 according to one embodiment. For ease of description, the live security check process 2000 uses the same sequence 1000 of interactions of FIG. 5 as noted by similar reference numbers. Once the IoT device 110 submits the identity token 1009 to the provisioning policy server 116 as the identity token 1011, the provisioning policy server 116 can verify the identity token 1009 at block 1013 and can issue an additional challenge 2013 to the IoT device 110. This challenge 2013 could be another static sequence, which would produce a response based on the current state of the IoT device 110. The IoT device 110 computes a response 2015 and sends it back to the provisioning policy server 116 to be validated. In parallel, the provisioning policy server 116 can send a request 2017 (getExpectedResponse) to the RoT identity server 114 via the authentication policy server 112 and receives the expected response 2019 from the RoT identity server 114 via the authentication policy server 112. The provisioning policy server 116 can compare the expected response 2019 against the response 2015 received from the IoT device 110 to see if they match. If they match, the provisioning policy server 116 can send data 2021 to the IoT device 110. If the response 2015 does not match the expected response 2019, the provisioning policy server 116 can send an error response to the IoT device 110. Alternatively, the provisioning policy server 116 does not send the error response.

It should be noted that this live security check would require the RoT identity server 114 to hold a state of the IoT device 110. For example, the RoT identity server 114 would have to cache the expected responses after it executes the Module.

In another embodiment, in addition to attesting to the data input into the cryptographic core, which may be useful in securing certificate enrollment, a scheme can be modified to produce a symmetric key that can be shared between the cryptographic core and the backend services.

Figure 16:
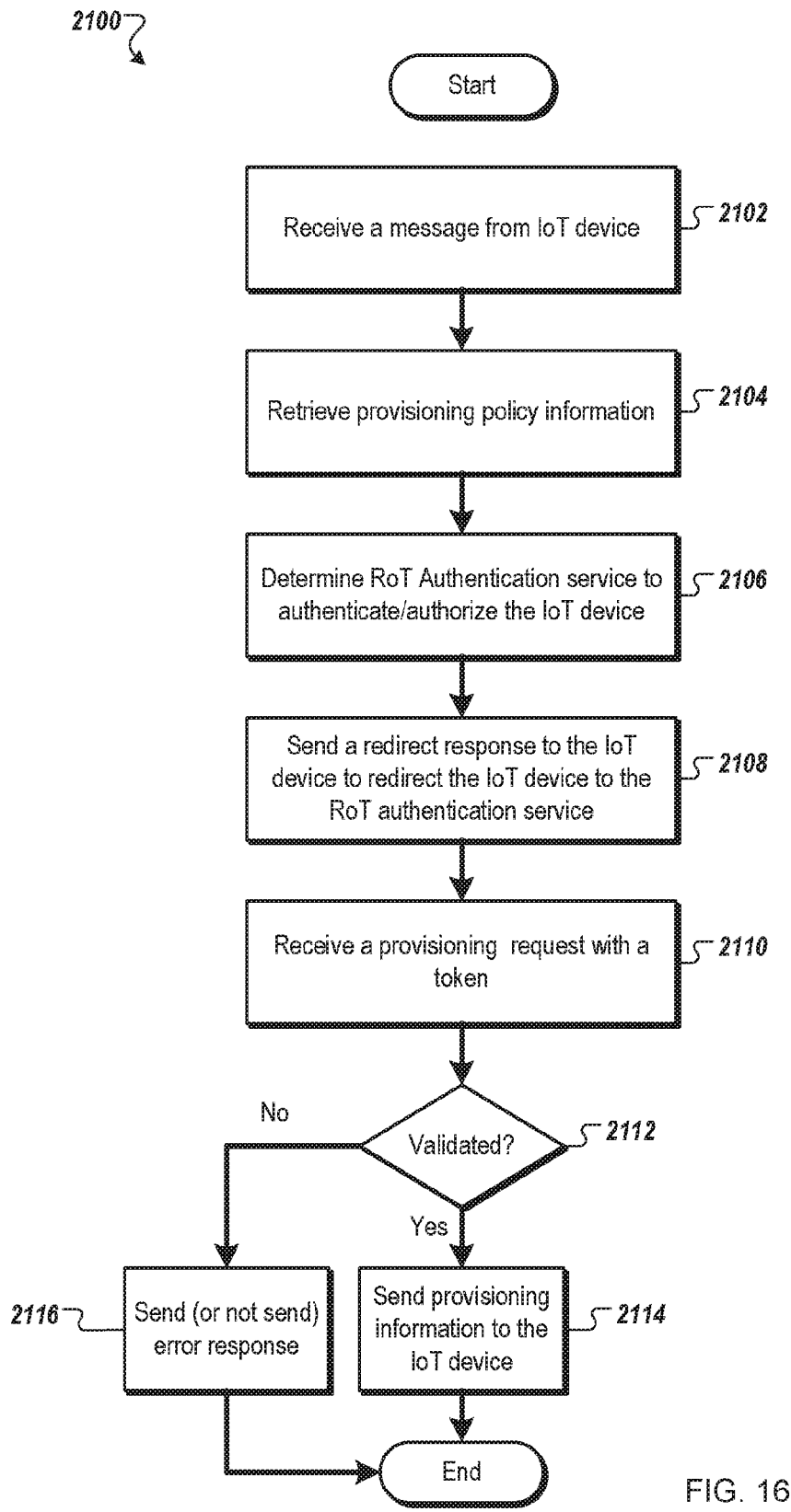
FIG. 16 is a flow diagram of a method for secure provisioning an IoT device according to one embodiment.

FIG. 16 is a flow diagram of a method 2100 for secure provisioning an IoT device according to one embodiment. The method 2100 may be performed by processing logic that may comprise hardware (e.g., circuitry, dedicated logic, programmable logic, microcode, etc.), software, firmware, or a combination thereof. The method 2100 may be performed one or more servers of a device provisioning service. Referring back to FIG. 16, the method 2100 begins with the processing logic at block 2102 receiving a message from an internet of things (IoT) device to securely provision the IoT device. The message includes a profile identifier. The processing logic retrieves provisioning policy information using the profile identifier (block 2104) and determines a Root of Trust (RoT) authentication service to authenticate and authorize the IoT device (block 2016). The processing logic sends a redirect response to the IoT device to re-direct the IoT device to the RoT authentication service to authenticate and authorize the IoT device (block 2108). The redirect response may include an encrypted policy identifier used to authenticate the IoT device. The processing logic subsequently receives a provisioning request that includes a token issued by the RoT authentication service (block 2110). The processing logic validates the provisioning request and the token (block 2112). When the provisioning request and token are validated at block 2112, the processing logic sends provisioning information to the IoT device (block 2114), and the method 2100 ends. If the provisioning request, token, or both are not validated at block 2112, the processing logic sends an error message (or not) (block 2116), and the method 2100 ends.

In a further embodiment, the processing logic registers the IoT device with an IoT application service when the provisioning request and token are validated at block 2112. In some cases it can register the token, the device, or both. The IoT application service can perform local registration and send an acknowledgement (ACK) back to the device provisioning service.

In a further embodiment, the processing logic exchanges security credentials with the RoT authentication service. The processing logic obtains (or otherwise receives) a list of authentication methods from the RoT authentication service. The authentication method is the process used to authenticate the IoT device, such as specified by an IoT platform provider. The processing logic selects an authentication method from the list and assigns a policy identifier for the authentication method. The processing logic sends the policy identifier and the authentication method to the RoT authentication service. The processing logic can also establish session keys with the RoT authentication service. In one embodiment, the policy identifier defines one or more requirements for tokens issued by the RoT authentication service. In another embodiment, the security credentials include a MAC In another embodiment, the processing logic receives the message by receiving a URL described in a MUD file, where the MUD file includes the profile identifier. In a further embodiment, the processing logic determines from the provisioning policy information an authentication method to be used to authenticate an IoT device by the RoT authentication service, the authentication method having an identification policy identifier. The processing logic encodes the identification policy identifier in a URL in the redirect response.

In another embodiment, the processing logic determines that the token in the provisioning request has an unknown format, sends a request to validate the token to the RoT authentication service, and receives a validation response from the RoT authentication service. In another embodiment, the processing logic determines that the token in the provisioning request contains RoT attributes and extracts the RoT attributes from the token. The processing logic sends a request to obtain additional RoT security attributes from the RoT authentication service, the additional RoT security attributes including an identification policy identifier. The processing logic validates the additional RoT security attributes.

In another embodiment, the processing logic receives a check access request from the IoT application service to check whether access to an IoT application should be granted to an IoT device. The check access request includes provisioned information of the IoT device. The processing logic verifies access of the IoT device using the provisioned information and sends a response to the IoT application service.

The various embodiments described above may be with respect to the operations performed by one or more servers of the device provisioning service described herein. In other embodiments, other methods may be performed by the specified servers of the devices as described herein, such as the provisioning policy server 116 and the provisioning server 118 of the device provisioning service 106. In other embodiments, other methods may be performed by the RoT authentication service, including the operations described above with respect to the authentication policy server 112 and the RoT identity server 114. Similarly, other methods may be performed by the IoT device 110, and the IoT application service 108, including the IoT application gateway 120 and the IoT application server 122 as described herein.

FIG. 17 is a diagram of one embodiment of a computer system 2200 in which any of the methodologies described herein may be performed according to one embodiment. The computer system 2200 may include a processor 2202, main memory 2204, storage memory 2206, chipset 2208, one or more peripherals 2210, a network interface device 2222, and a removable storage device interface 2203 is configurable to connect with a removable storage device 2215. The processor 2202 is operable to execute instructions 2226 (or software) according to any of the methodologies described herein. The instructions 2226 may include instructions that are stored in main memory 2204 or in removable storage device 2205 and executed by the processor 2202 and can be used to perform various operations regarding authentication, identity, attestation, and live security check services as described herein. In one embodiment, the computer system 2200 represents any one or more of the devices of the IDM 100 of FIG. 1, such as the IoT device 110, the authentication policy server 112, the RoT identity server 114, the provisioning policy server 116, the provisioning server 118, the IoT application gateway 120, the IoT application server 122, or any device of the IoT secure analytics service 130.

The computer system 2200 in some cases may be connected (e.g., networked) to other machines in a LAN, an intranet, an extranet, or the Internet. The computer system 2200 can be a host in a cloud, a cloud provider system, a cloud controller, a server, a client, or any other machine. The computer system 2200 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 2200 includes a processor 2202 (e.g., host processor or processing device), a main memory 2204 (e.g., read-only memory (ROM), flash memory, dynamic random access memory (DRAM), a storage memory 2206 (e.g., flash memory, static random access memory (SRAM), etc.), and a secondary memory 2218 (e.g., a data storage device in the form of a drive unit, which may include fixed or removable computer-readable storage medium), which communicate with each other via a bus 2230.

Processor 2202 represents one or more general-purpose processing devices such as a microprocessor, central processing unit, or the like. More particularly, the processor 2202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 2202 may also be one or more special-purpose processing devices such as an application specific integrated circuit (ASIC), a field programmable gate array (FPGA), a digital signal processor (DSP), network processor, or the like.

In one embodiment, the processor 2202 may reside on a first integrated circuit and the main memory 2204 may reside on a second integrated circuit. For example, the integrated circuit may include a host computer (e.g., CPU having one more processing cores, L1 caches, L2 caches, or the like), a host controller, or other types of processors 2202. The second integrated circuit may include a memory device coupled to the host device, and whose primary functionality is dependent upon the host device, and can therefore be considered as expanding the host device's capabilities, while not forming part of the host device's core architecture. The memory device may be capable of communicating with the host device. For example, the memory device may be a single IC or a multi-IC Module including any combination of single IC devices on a common integrated circuit substrate. The components of FIG. 17 can reside on "a common carrier substrate," such as, for example, an integrated circuit ("IC") die substrate, a multi-IC Module substrate, or the like. Alternatively, the memory device may reside on one or more printed circuit boards, such as, for example, a mother board, a daughter board, or other type of circuit card. In other implementations, the main memory and processor 2202 can reside on the same or different carrier substrates.

The computer system 2200 may include a chipset 2208, which refers to a group of integrated circuits, or chips, that are designed to work with the processor 2202 and controls communications between the processor 2202 and external devices. For example, the chipset 2208 may be a set of ICs on a motherboard that links the processor 2202 to very high-speed devices, such as main memory 2204 and graphic controllers, as well as linking the processing device to lower-speed peripheral buses of peripherals 2210, such as USB, PCI or ISA buses. In one embodiment, the removable storage device interface 2203 can be implemented in the chipset 2208.

The computer system 2200 may further include a network interface device 2222. The computer system 2200 also may include one or more peripherals 2210, such as a video display unit (e.g., a liquid crystal display (LCD)) connected to the computer system through a graphics port and graphics chipset, an alphanumeric input device (e.g., a keyboard), a cursor control device (e.g., a mouse), a signal generation device (e.g., a speaker), or the like.

Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method comprising:
   receiving, at a device provisioning service, a message from an internet of things (IoT) device to securely provision the IoT device, the message comprising a profile identifier and a provisioning request;
   retrieving provisioning policy information using the profile identifier;

determining a Root of Trust (RoT) authentication service to authenticate and authorize the IoT device;

sending, by the device provisioning service, a redirect response to the IoT device to redirect the IoT device to the RoT authentication service to authenticate and authorize the IoT device, wherein the redirect response comprises an encrypted policy identifier used to authenticate the IoT device, receiving, at the device provisioning service, a provisioning request comprising a token issued by the RoT authentication service;

validating the provisioning request and the token; and when the provisioning request and token are validated, sending provisioning information to the IoT device by the device provisioning service.

2. The method of claim 1, further comprising:

registering, by the device provisioning service, the IoT device with an IoT application service when the provisioning request and token are validated.

3. The method of claim 1, further comprising:

exchanging, by the device provisioning service, security credentials with the RoT authentication service;

obtaining a list of authentication methods from the RoT authentication service; selecting an authentication method from the list;

assigning a policy identifier for the authentication method;

sending the policy identifier and the authentication method to the RoT authentication service; and establishing session keys with the RoT authentication service.

4. The method of claim 3, wherein the policy identifier defines one or more requirements for tokens issued by the RoT authentication service.

5. The method of claim 3, wherein the security credentials comprise a message authentication code (MAC).

6. The method of claim 1, wherein receiving the message comprises receiving a uniform resource locator (URL) described in a manufacturer usage description (MUD) file, wherein the MUD file comprises the profile identifier.

7. The method of claim 1, further comprising:

determining from the provisioning policy information an authentication method to be used to authenticate an IoT device by the RoT authentication service, the authentication method having an identification policy identifier; and encoding the identification policy identifier in a uniform resource locator (URL) in the redirect response.

8. The method of claim 1, further comprising:

determining that the token in the provisioning request has an unknown format;

sending a request to validate the token to the RoT authentication service; and receiving a validation response from the RoT authentication service.

9. The method of claim 1, further comprising:

determining that the token in the provisioning request contains RoT attributes; extracting the RoT attributes from the token;

sending a request to obtain additional RoT security attributes from the RoT authentication service, the additional RoT security attributes comprising an identification policy identifier; and validating the additional RoT security attributes.

10. The method of claim 2, further comprising:

receiving a check access request from the IoT application service to check whether access to an IoT application should be granted to an IoT device, wherein the check access request comprises provisioned information of the IoT device;

verifying access of the IoT device using the provisioned information; and sending, by the device provisioning service, a response to the IoT application service.

11. A method comprising:

receiving, at a Root of Trust (RoT) authentication service from a device provisioning service, provisioning policy information that defines requirements for issuing a token;

receiving, at the RoT authentication service, a redirect message from an internet of things (IoT) device to authenticate and authorize the IoT device, the redirect message comprising a policy identifier used to identify the provisioning policy information and a provisioning request;

authenticating and authorizing the IoT device by the RoT authentication service according to the provisioning policy information;

issuing a token when the IoT device is authenticated and authorized; and sending a redirect response to the IoT device with the issued token, the redirect response redirects the IoT device to the device provisioning service with the issued token for the provisioning request to securely provision the IoT device;

exchanging, by the RoT authentication service, security credentials with the device provisioning service;

providing a list of authentication methods to the device provisioning service, receiving a selection of an authentication method from the list;

receiving an assignment of the policy identifier and the authentication method from the device provisioning service; and establishing session keys with the device provisioning service.

12. The method of claim 11, wherein the policy identifier defines one or more requirements for tokens issued by the RoT authentication service.

13. The method of claim 11, wherein the security credentials comprise a message authentication code (MAC).

14. The method of claim 11, wherein receiving the redirect message comprises receiving a uniform resource locator (URL) encoded with an identification policy identifier.

15. A system for establishing a distributed trust network, having:

a device provisioning service to securely provision an internet of things (IoT) device, the device provisioning service to:

receive a message from the IoT device to securely provision the IoT device, the message comprising a profile identifier and a provisioning request;

retrieve provisioning policy information using the profile identifier;

determine a Root of Trust (RoT) authentication service to authenticate and authorize the IoT device;

send a redirect response to the IoT device to redirect the IoT device to the RoT authentication service to authenticate and authorize the IoT device, wherein the redirect response comprises an encrypted policy identifier used to authenticate the IoT device, receive a provisioning request comprising a token issued by the RoT authentication service;

validate the provisioning request and the token; and when the provisioning request and token are validated, send provisioning information to the IoT device.

16. The system of claim 15, wherein the device provisioning service is further to register the IoT device with an IoT application service when the provisioning request and token are validated.

17. The system of claim 15, wherein the device provisioning service is further to:

exchange security credentials with the RoT authentication service;

obtain a list of authentication methods from the RoT authentication service;

select an authentication method from the list;

assign a policy identifier for the authentication method;

send the policy identifier and the authentication method to the RoT authentication service; and establish session keys with the RoT authentication service.

18. The system of claim 17, wherein the policy identifier defines one or more requirements for tokens issued by the RoT authentication service.

19. The system of claim 17, wherein the security credentials comprise a message authentication code (MAC).

20. The system of claim 15, wherein the message comprises a uniform resource locator (URL) described in a manufacturer usage description (MUD) file, wherein the MUD file comprises the profile identifier.

21. The system of claim 15, wherein the device provisioning service is further to:

determine from the provisioning policy information an authentication method to be used to authenticate an IoT device by the RoT authentication service, the authentication method having an identification policy identifier; and encode the identification policy identifier in a uniform resource locator (URL) in the redirect response.

22. The system of claim 15, wherein the device provisioning service is further to:

determine that the token in the provisioning request has an unknown format;

send a request to validate the token to the RoT authentication service; and receive a validation response from the RoT authentication service.

23. The system of claim 15, wherein the device provisioning service is further to:

determine that the token in the provisioning request contains RoT attributes; extracting the RoT attributes from the token;

send a request to obtain additional RoT security attributes from the RoT authentication service, the additional RoT security attributes comprising an identification policy identifier; and validate the additional RoT security attributes.

24. The system of claim 16, wherein the device provisioning service is further to:

receive a check access request from the IoT application service to check whether access to an IoT application should be granted to an IoT device, wherein the check access request comprises provisioned information of the IoT device;

verify access of the IoT device using the provisioned information; and send a response to the IoT application service.

25. The system of claim 15, wherein the device provisioning service further comprises a front-end provisioning policy server and a back-end provisioning server to provide the secure provisioning services.

26. The system of claim 15, wherein the distributed trust network further comprises:

the RoT authentication service with direct knowledge of an RoT of the IoT device, providing authentication services and secure provisioning services of the IoT device on behalf of an application service, so that the application service can establish a trusted connection with the IoT device without having direct knowledge of the RoT of the IoT device, wherein the RoT service comprises an authentication policy server and an RoT identity server to provide the authentication services, wherein a front-end protocol of the authentication policy server is protocol-specific to the IoT device and holds a state of the IoT device, wherein a back-end protocol between the authentication policy server and the RoT identity server is independent of the front-end protocol and is state-less.

27. The system of claim 26, wherein the direct knowledge is based on at least one key provisioned during device manufacturing of the IoT device, wherein the front-end protocol comprises a chip manufacturer's business requirements for the IoT device, a communication protocol, and an authentication protocol.

28. The system of claim 26, further comprising the IoT device, wherein the RoT of the IoT device is at least one of a hardware RoT or a software RoT, wherein the authentication policy server and the RoT identity server communicate using Transport Layer Security (TLS) and Hyper Text Transfer Protocol Secure (HTTPS).

29. The system of claim 26, further comprising the application service, the application service to provide an application to the IoT device, wherein the application service comprises a front-end application gateway and a back-end application server, wherein the front-end application gateway and the back-end application server communicate using Hyper Text Transfer Protocol Secure (HTTPS).

* * * * *